US012149667B2

(12) United States Patent
Azechi et al.

(10) Patent No.: US 12,149,667 B2
(45) Date of Patent: Nov. 19, 2024

(54) PRINTING SYSTEM

(71) Applicant: BROTHER KOGYO KABUSHIKI KAISHA, Nagoya (JP)

(72) Inventors: Haruka Azechi, Nagoya (JP); Shunsuke Minamikawa, Nagoya (JP); Tetsuya Okuno, Nagoya (JP); Ayaka Hotta, Nagoya (JP); Yushi Deura, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/325,197

(22) Filed: May 30, 2023

(65) Prior Publication Data

US 2023/0308587 A1    Sep. 28, 2023

Related U.S. Application Data

(63) Continuation of application No. PCT/JP2021/039988, filed on Oct. 29, 2021.

(30) Foreign Application Priority Data

Nov. 30, 2020   (JP) .................................. 2020-198910

(51) Int. Cl.
  *H04N 1/34*    (2006.01)
  *H04N 1/32*    (2006.01)
(52) U.S. Cl.
  CPC ......... *H04N 1/344* (2013.01); *H04N 1/32128* (2013.01)

(58) Field of Classification Search
  CPC ........................... H04N 1/344; H04N 1/32128
  See application file for complete search history.

(56) References Cited

U.S. PATENT DOCUMENTS

| 2009/0066985 A1 | 3/2009 | Ferlitsch |
| 2013/0057884 A1* | 3/2013 | Sasaki ................... G06F 3/1239 358/1.9 |

(Continued)

FOREIGN PATENT DOCUMENTS

| JP | 2003263485 A | 9/2003 |
| JP | 2007193606 A | 8/2007 |

(Continued)

OTHER PUBLICATIONS

International Search Report dated Dec. 14, 2021 issued in PCT/JP2021/039988.

(Continued)

*Primary Examiner* — Akwasi M Sarpong
*Assistant Examiner* — Michael L Burleson
(74) *Attorney, Agent, or Firm* — Scully, Scott, Murphy & Presser, P.C.

(57) ABSTRACT

A printing system includes a print engine, and one or more controllers configured to perform a data obtaining process of obtaining print data, a print controlling process of controlling the print engine to print an image corresponding to the print data on a printing medium based on a print setting value, and a fee determining process of determining a fee corresponding to a plurality of the print setting values to be applied when the print engine prints the image on the printing medium.

9 Claims, 21 Drawing Sheets

(56) References Cited

U.S. PATENT DOCUMENTS

| | | | | |
|---|---|---|---|---|
| 2014/0078522 | A1* | 3/2014 | Hiraki | G06Q 20/085 |
| | | | | 358/1.2 |
| 2014/0376049 | A1* | 12/2014 | Von Stein | G06F 3/1292 |
| | | | | 358/1.15 |
| 2015/0293727 | A1 | 10/2015 | Miyazawa et al. | |
| 2015/0371118 | A1* | 12/2015 | Lin | G06F 3/1285 |
| | | | | 358/1.15 |
| 2018/0082097 | A1 | 3/2018 | Sun et al. | |
| 2018/0213115 | A1 | 7/2018 | Sun et al. | |
| 2020/0387887 | A1* | 12/2020 | Rathod | G06Q 20/3224 |

FOREIGN PATENT DOCUMENTS

| | | | |
|---|---|---|---|
| JP | 2013152368 | A | 8/2013 |
| JP | 2015201133 | A | 11/2015 |
| JP | 2016172452 | A | 9/2016 |
| JP | 2018043470 | A | 3/2018 |
| JP | 2018118406 | A | 8/2018 |

OTHER PUBLICATIONS

International Report on Patentability and Written Opinion dated May 30, 2023 issued in PCT/JP2021/039988 together with English translation.

Notice of Reasons for Refusal dated Apr. 12, 2024 received in related Japanese Patent Application No. JP 2020-198910.

Extended European search report dated Oct. 1, 2024 received in European Patent Application No. 21897623.1.

\* cited by examiner

PRINTING SYSTEM

REFERENCE TO RELATED APPLICATIONS

This is a Continuation Application of International Application No. PCT/JP2021/039988 filed on Oct. 29, 2021, which claims priority from Japanese Patent Application No. 2020-198910 filed on Nov. 30, 2020. The entire disclosures of the prior applications are incorporated herein by reference.

BACKGROUND

The present disclosures relate to a printing system in which fees are charged according to printing of an image on a printing medium.

Conventionally, there are known printing services that charge users according to the content of the image to be printed and allow the images to be printed after the payment process for the charged fee has been completed through electronic payment.

DESCRIPTION

When receiving printing services with electronic payment as described above, one print setting value is usually determined in the print settings when printing an image. In some cases, the service provider has already set one setting value in advance, while in other cases, the user sets one desired setting value. However, there may be other print setting values that are even more compatible with the user's intentions and preferences than that one print setting value, for example, in terms of the fees charged. Therefore, it would be convenient if multiple print setting values, including other print setting values as described above, and multiple fees corresponding to each of such setting values were presented to the user as candidates before the final application decision is made, but there has been no technology that takes such a point into consideration.

According to aspects of the present disclosures, there is provided a printing system including a print engine, and one or more controllers. The one or more controllers configured to perform a data obtaining process of obtaining print data, print controlling process of controlling the print engine to print an image corresponding to the print data on a printing medium based on a print setting value, and a fee determining process of determining a fee corresponding to a plurality of the print setting values to be applied when the print engine prints the image on the printing medium.

FIGS. 10A and 10B are Examples of a payment portal page displayed on a mobile terminal device or the like.

Hereinafter, embodiments according to aspects of the present disclosures will be described with reference to the drawings.

Figure 1:
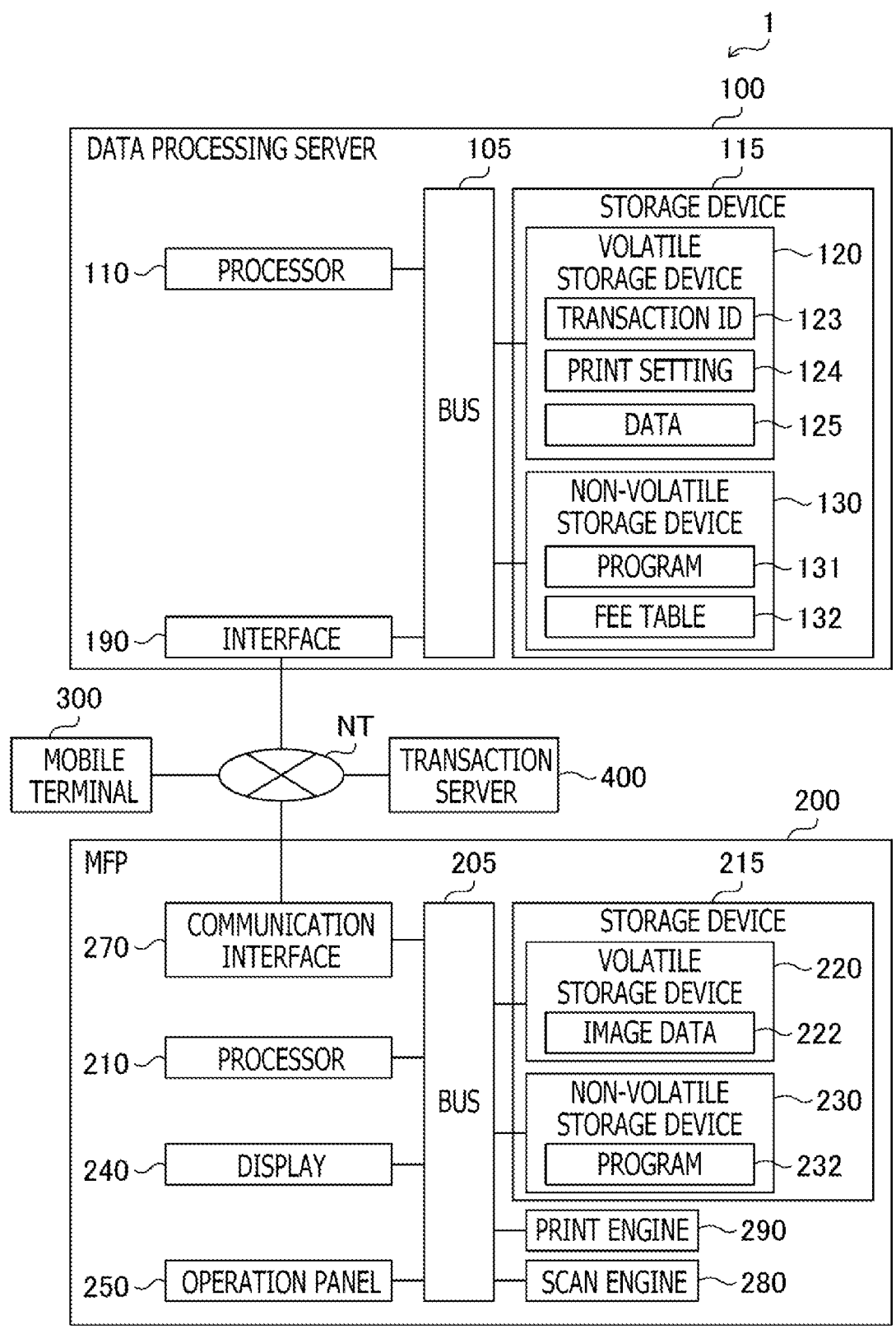
FIG. 1 is a block diagram showing an overall configuration of a printing system.

Initially, a first embodiment will be described with reference to FIGS. 1-10. FIG. 1 shows a printing system according to the present embodiment. The present embodiment is a printing system 1, which provides a print service allowing a user, who is a customer, to use a printing function of an MFP (multifunction peripheral) 200 by paying fees, and allowing the user to transmit a print file to be printed by email.

Overview of Printing System

In FIG. 1, the printing system 1 includes a data processing server 100, the MFP 200, a mobile terminal 300, and a transaction server 400. The data processing server 100, the MFP 200, the mobile terminal 300, and the transaction server 400 are connected to a network NT, and communicable with each other.

Data Processing Server

The data processing server 100 is a server installed and managed, for example, by a manufacturer of the MFP 200, and provided with a processor 110, a storage device 115 and an interface 190. The processor 110 is an example of a second controller, and the interface 190 is an example of a communication I/F (interface). The processor 110, the storage device 115, and the interface 190 are interconnected via a bus 105.

The storage device 115 is provided with a volatile storage device 120 and a non-volatile storage device 130. The volatile storage device 120 is, for example, a DRAM which has a transaction ID storage area 123, a print setting storage area 124, and a data storage area 125. The data storage area 125 is an example of a server memory. The non-volatile storage device 130 is, for example, a hard disk drive or a solid state drive, and has a program storage area 131 storing various programs, and a fee table storage area 132. Contents stored in respective storage areas will be described later.

Among programs stored in the program storage area 131, print process programs related to the execution of sequence flows shown in FIGS. 2, 5, 8, 12, 14, 17, 19 and 20 are stored, for example, in the non-volatile storage device 130 in advance.

The processor 110 is a device performing data processing, and is, for example, a CPU. The processor 110 executes the information processing program mentioned above, which is stored in the program storage area 131, to perform a print processing method of the printing system according to the present embodiment in association with a processor 210 (described later) of the MFP 200. In this way, various processes shown in FIGS. 2, 5, 8, 12, 14, 17, 19, and 20, and including a data communication with the mobile terminal 300, the MFP 200, and the transaction server 400 connected to the network NT, are performed.

The interface 190 may be a wired LAN interface or a wireless interface to communicate with other devices, and connected to the network NT.

Transaction Server 400

The transaction server 400 is located, for example, in a company that provides an online payment service using an appropriate payment application program as described later, and has a processor, a storage device, and an interface for connecting to the network NT (not shown).

MFP

The MFP 200 is owned, for example, by a business provider of the above printing services. The MFP 200 is an example of a printing device. The MFP 200 has a scan engine 280, a print engine 290, a processor 210, a storage device 215, a display 240, a user-operable operation panel 250, and a communication interface 270. The scan engine 280, the print engine 290, the processor 210, the storage device 215, the display 240, the user-operable operation panel 250, and the communication interface 270 are interconnected via a bus 205.

The storage device 215 includes a volatile storage device 220 and a non-volatile storage device 230. The volatile storage device 220 is, for example, a DRAM, which has a data storage area 222 configured to store image data. The non-volatile storage device 230 is, for example, a flash memory. The non-volatile storage device 230 has a program storage area 232. Among various programs stored in the program storage area 232, a printing program related to execution of sequence charges in FIGS. 2, 5, 8, 12, 14, 17, 19, and 20, have been stored in advance in the non-volatile storage device 230, for example, as firmware.

The processor 210 is a device configured to perform data processing, and is, for example, a CPU. The processor 210 is configured to execute the print processing program stored in the program storage area 232, and performs a printing method according to the printing system 1 of the present embodiment in association with the processor 210. In this way, the processor 210 is configured to cause the print engine 290 to form an image based on image data transmitted form the mobile terminal 300. It is noted that the processor 210 is an example of a first controller. It is also noted that, in the present specification, to form an image on a printing paper will occasionally be referred to simply as "to print" or the like.

The display 240 is, for example, an LCD (liquid crystal display). The operation panel 250 is a device configured to receive operations by a user. The user can input various instructions to the MFP 200 by operating the operation panel 250. The communication interface 270 is a wireless or wired network interface to communicate with another device, and is connected to the network NT.

The scan engine 280 is configured to optically read an original, which is subject to the scanning, with a photoelectric conversion device such as a CCD or a CMOS, and generate image data representing read image.

The print engine 290 is configured to pick up and convey a printing paper accommodated in a paper feed tray with a conveying mechanism (not shown), and print an image on the conveyed printing paper in accordance with a particular method. In the following description, a case where printing is performed in accordance with an inkjet method will be described as an example. It is noted that the printing paper is an example of a printing medium.

Mobile Terminal

The mobile terminal 300, in this example, is a user-owned mobile terminal such as a smartphone, which is connected to the network NT via the wireless communication. The mobile terminal 300 has a storage device and an interface to connect to the network NT (not shown). The mobile terminal 300 is an example of an external device according to the present embodiment. It is noted that, as the external device, other information terminals such as a personal computer, a tablet computer or the like, may be used instead of the mobile terminal 300.

Processing of Print File Using Mail Attachment

In the printing system 1 configured as described above, according to the present embodiment, the mobile terminal 300 transmits email, to which the print file containing image data is attached, to the data processing server 100, thereby printing of the print file being performed by the MFP 200. Further, processing related to the payment of a printing fee at that time is carried out by so-called electronic payment. Hereafter, the details will be explained step by step.

Process Flow

The control sequence of the processes performed by the processor 210 of the MFP 200, the processor 110 of the data processing server 100, the processor of the transaction server 400, and the processor of the mobile terminal 300 according to the present embodiment will be described with reference to FIGS. 2, 5 and 8. In the following descriptions of FIGS. 2, 5 and 8, descriptions of each processor are omitted and expressions such as "in the processor of the MFP 200," "by the processor of the MFP 200," and the like are simply expressed as "in the MFP 200," "by the MFP 200," and the like.

Transmitting/Receiving of Print Job

Figure 2:
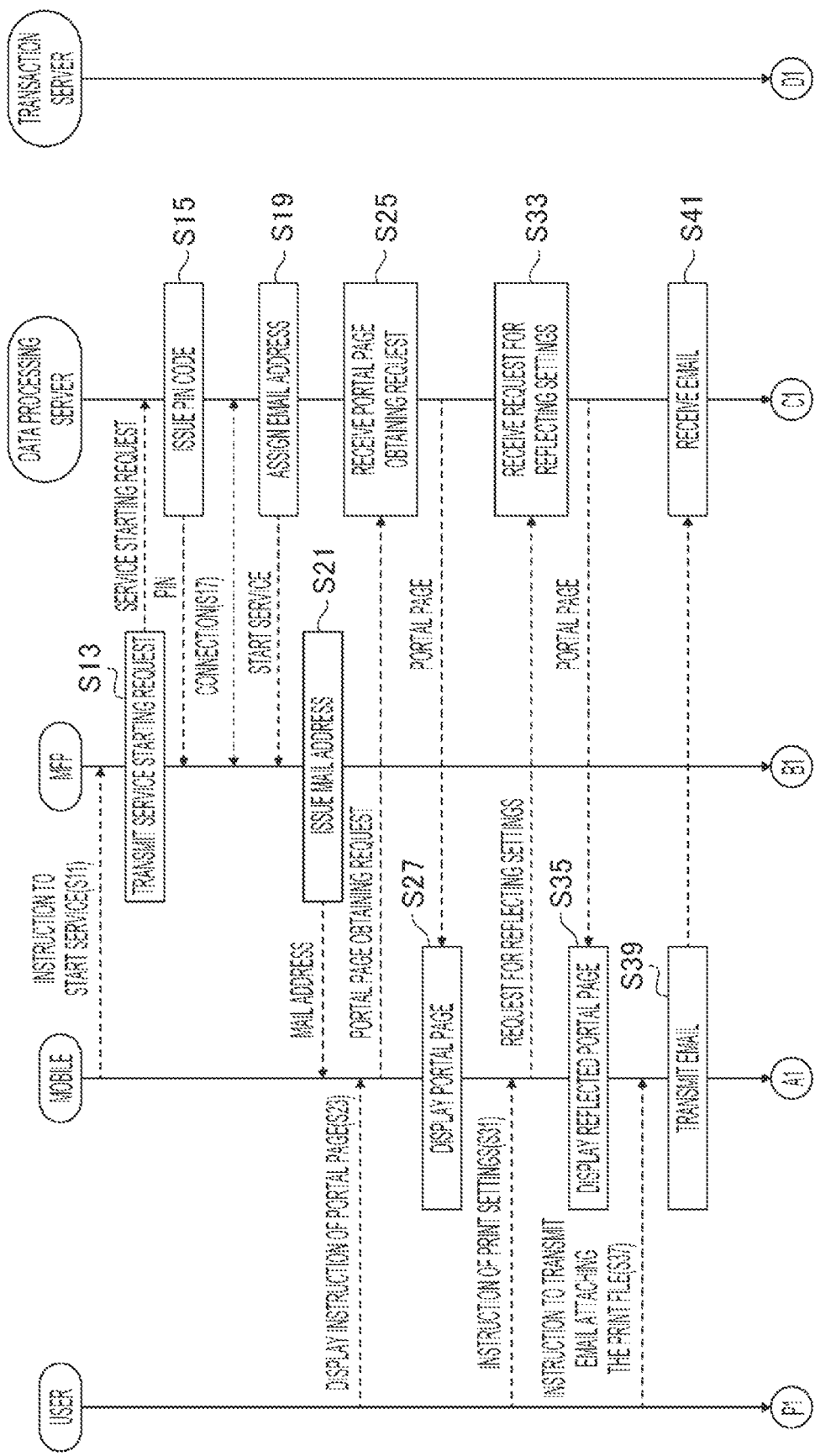
FIG. 2 is a sequence flow illustrating processes performed by a mobile terminal, an MFP (multi-function peripheral), a data processing server and a transaction server.

In FIG. 2, the user firstly appropriately operates the mobile terminal 300 or another appropriate terminal or the like to connect the MFP 200 with the data processing server 100 to start a service according to the above-described print processing method according to the present invention (S11). From the MFP 200, according to the above, a service starting request is transmitted, which is received by the data processing server 100 (S13).

In response to receipt of the service start request, a PIN code is issued by the data processing server 100, which is received by the MFP 200 (S15). By using the PIN code, the connection of the wireless communication between the MFP 200 and the data processing server 100 is established (S17). After the connection is established, the data processing server 100 assigns an email address to the MFP 200, and the above-mentioned service is started (S19). In response to the start of the service, in the MFP 200, the assigned email address is issued, which is transmitted to the mobile terminal 300 and the like (S21). The email address assigned to the MFP 200 will be simply referred to as "an email address of the MFP 200" in the following description. It is noted that the email address of the MFP 200 is an example of an email address for the printing device.

Thereafter, when the user performs appropriate operations via the mobile terminal 300 and the like, the user accesses a URL of a print setting page of a portal site to perform print settings when the printing is performed by the MFP 200, and a display instruction requesting to display the print setting page is made (S23). It is noted that the above URL is an example of a first URL, which will be referred to simply as a "first URL" in the following description. From the mobile terminal 300, in response to the above request, a portal page obtaining request is transmitted, which is received by the data processing server 100 (S25). As display data of the portal page corresponding to the portal page obtaining request is output from the data processing server 100 to the mobile terminal 300, a portal page for the print setting is displayed by the mobile terminal 300 (S27).

Figure 3:
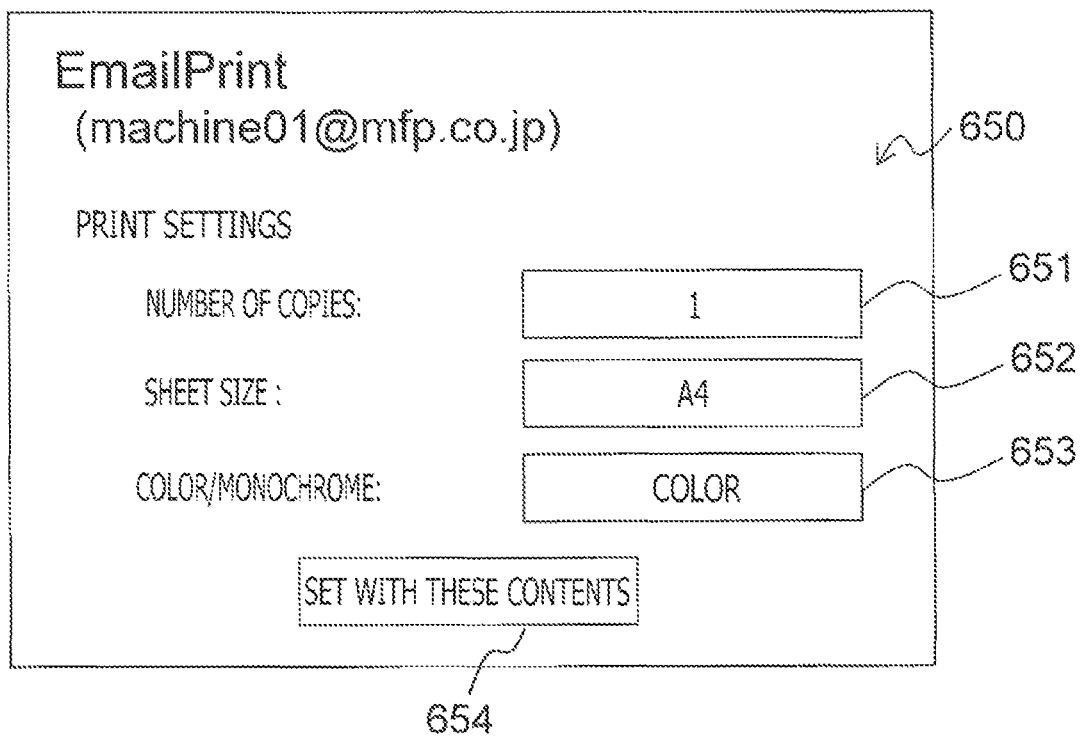
FIG. 3 is an example of a print setting portal page displayed on the mobile terminal.

FIG. 3 shows an example of the print setting portal page 650 described above that is displayed on the mobile terminal 300. For performing the above print settings, the print setting portal page 650 has a number of copies setting field 651 for entering the number of copies to be printed, a paper size setting field 652 for selecting the paper size, and a print color setting field 653 for selecting a print color setting, which represents color or monochrome printing. In this example, "1" is set in the number of copies setting field 651, "A4" is set in the paper size setting field 652, and "color" is set in the print color setting field 653. The number of copies, paper size, and print color are only examples, and although not show in the drawings, there are also other settings such as a paper type setting field for selecting a plain paper or a glossy paper, a print quality setting field for selecting a "normal" mode or a "clean" mode, and a border setting field for selecting printing with or without borders, and the like. The set contents in all the setting fields including the above setting fields 651, 652 and 653 are examples of print setting values. In other words, the "print setting values" are not limited to those expressed numerically, such as the contents of the number of copies setting field 651, but also include setting factors that can be selected and/or specified by the user, such as the contents of the paper size setting field 652, the print color setting field 653, the paper type setting field, the print quality setting field, and the borders setting field, which are expressed in a non-numerical form such as kind or type.

In the print setting portal page 650, in addition to the above-described setting fields 651, 652 and 653, a "set with these contents" button 654 is provided. After making desired setting in each of the fields 651, 652 and 653, when the user operates the "set with these contents" button 654, an instruction of the print settings is made (S31). The print setting values at this time are examples of first print setting values. Thereafter, a request to reflect the settings is transmitted from the mobile terminal 300, which is received by the data processing server 100 (S33). The process performed in S33 by the processor 110 of the data processing server 100 is an example of a print setting value obtaining process according to aspects of the present disclosures. As display data of the portal page reflecting the print settings above is transmitted from the data processing server 100 to the mobile terminal 300 in response to receipt of the request in S33, the mobile terminal 300 displays the print setting portal page after the reflection (S35).

Figure 4:
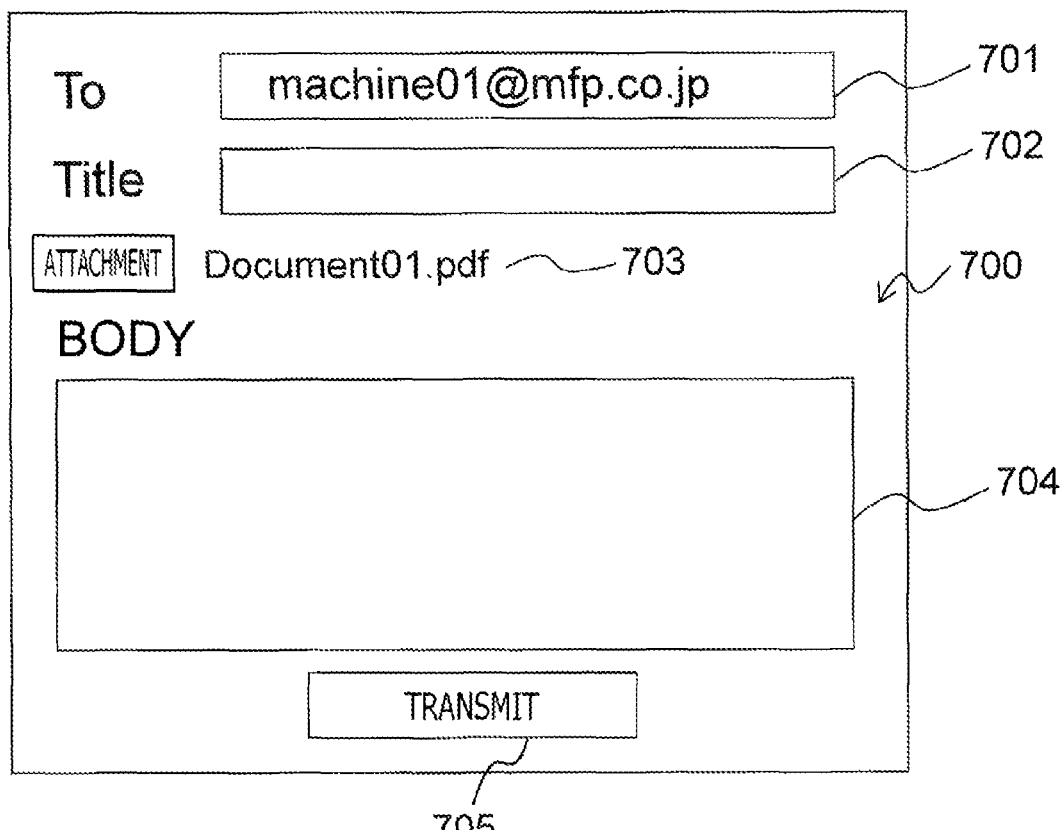
FIG. 4 is an example of a mail transmission screen displayed on the mobile terminal.

As above, the print setting for the MFP 200 when the printing is performed is completed. In this state, by operating the mobile terminal 300 as appropriate, the user sends an email with an attached print file containing the desired image data to be printed by the multifunction device 200 to the email address received in S21 above. FIG. 4 shows an example of a mail transmission screen that is displayed at this stage by appropriate mailing software on the mobile terminal 300.

In FIG. 4, the mail transmission screen 700 includes a destination display field 701, a subject field 702, an attached file display field 703, a body field 704, and a "Transmit" button 705. In this example, in the destination display field 701, an email address of the MFP 200, that is, "machine01@mfp.cajp" has been entered as the destination, and a file name "Document01.pdf" has been entered in an attached file display field 703 which is the name of the print file attached to this mail and contains image data. By an appropriate operation by the user on the mobile terminal 300, when the "Transmit" button 705 is clicked, transmission of the email attaching the print file "Document01.pdf" is instructed (S37), and the email is transmitted from the mobile terminal 300 (S39). As mentioned above, the email address at this stage is the address assigned to the MFP 200 by the data processing server 100. However, it is configured in advance that the email transmitted to the email address is received by the data processing server 100, and is stored in a particular area of the data processing server 100. That is, the email transmitted from the mobile terminal 300 as mentioned above is received by the data processing server 100 (S41). This email is an example of a first email, and a process performed in S41 is an example of a mail receiving process. It is noted that the format of the print file may be any format if the file can be printed by the MFP 200, and the file format may be a "jpeg" format, a "pdf" format, a "tiff" format, a "gif" format and the like.

Figure 5:
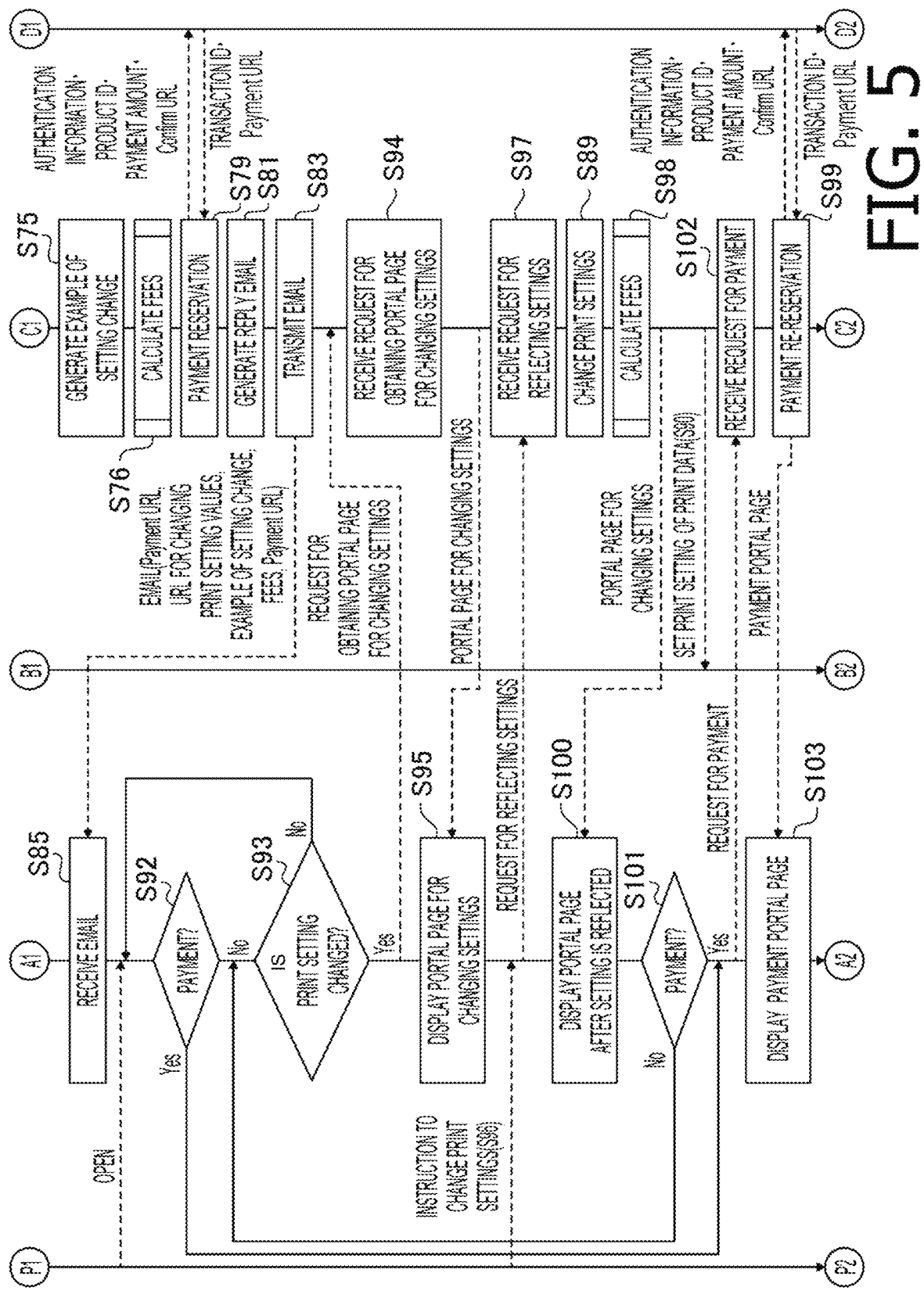
FIG. 5 is a sequence chart illustrating processes performed by the mobile terminal, the MFP, the data processing server and the transaction server.

Then, the process moves to FIG. 5, and in S75, the data processing server 100 generates at least one example of changes made to the print setting values received from the mobile terminal 300 in S33 shown in FIG. 2, using an appropriate method. The process performed in S75 is an example of a first print setting value generating process. The process performed in S75 by the processor 110 of the data processing server 100 is an example of the first print setting value generating process. The details of the example of changes at this time will be described later.

Thereafter, in S76, the data processing server 100 analyzes the print file attached to the email received in S41, and calculates the fee to be charged to the user for printing the image data contained in the print file. This amount is an example of a first amount. Hereafter, this amount will be referred to simply as the "first amount" as appropriate. In S76, the amount of the fee when applying the example of changes to the print setting values generated in S75 when printing the above image data is also calculated. This amount is an example of a second amount, and in the present embodiment, this amount is hereinafter referred to simply as the "second amount" as appropriate. The process performed in S76 is an example of a first fee determining process and also an example of a second fee determining process. The processor 110 of the data processing server 100 that executes S76 is an example of a fee determining section in the present embodiment. In this calculation, for example, the fee is calculated based on a particular fee table stored in the fee table storage area 132 of the volatile storage device 120. At that time, the calculation is performed by taking into account the print setting values in each of the setting fields 651, 652, 653, and the like of the above-mentioned portal page 650 for print settings and received in S33 described above. That is, in the above fee table, particular correlations regarding at least one of the print setting values of basic information such as the number of pages, the number of copies, the paper size, the printing color, and the type of printing paper, and extensive information including, for example, the duty ratio of image data, print coverage, and the like, are set. When the value of the at least one print setting is determined, a corresponding fee can be calculated by substituting the determined value into the particular correlations.

Thereafter, in S79, the payment reservation process is performed in the data processing server 100. Concretely, the product ID issued for the execution of the service to print the image data of the print file, the first and second amounts as the result of the calculation in S76, the authentication information to be used for authentication on the transaction server 400, and the Confirm URL, which is the URL for confirming the completion of the payment (in the present embodiment, the URL of the data processing server 100), are transmitted to the transaction server 400. Further, the Payment URL for the user to access and pay the first amount and the Payment URL for the second amount, and the transaction ID related to the fee payment procedure, transmitted from the transaction server 400 in response to the above transmissions, are received by the data processing server 100. The Payment URL for paying the first amount is an example of a second URL, and in the present embodiment, this Payment URL is referred to simply as the "second Payment URL" as appropriate. The Payment URL for paying the second amount is an example of a third URL, and in the present embodiment, this Payment URL is hereinafter referred to simply as the "third Payment URL" as appropriate.

Then, in S81, the data processing server 100 generates a reply email to the mobile terminal 300, which contains the first amount, the second Payment URL obtained in S79, the content of the example of the change of the print setting values generated in S75, the corresponding second amount, and the third Payment URL obtained in S79 corresponding to the second amount. Further, in S81, the URL to access the portal page for the user to change the print setting values received in S33 to desired values, which is related to the first amount mentioned above, is also included in the reply email. The above reply email is an example of the second email, and the process executed in S81 is an example of the email generating process.

Figure 6:
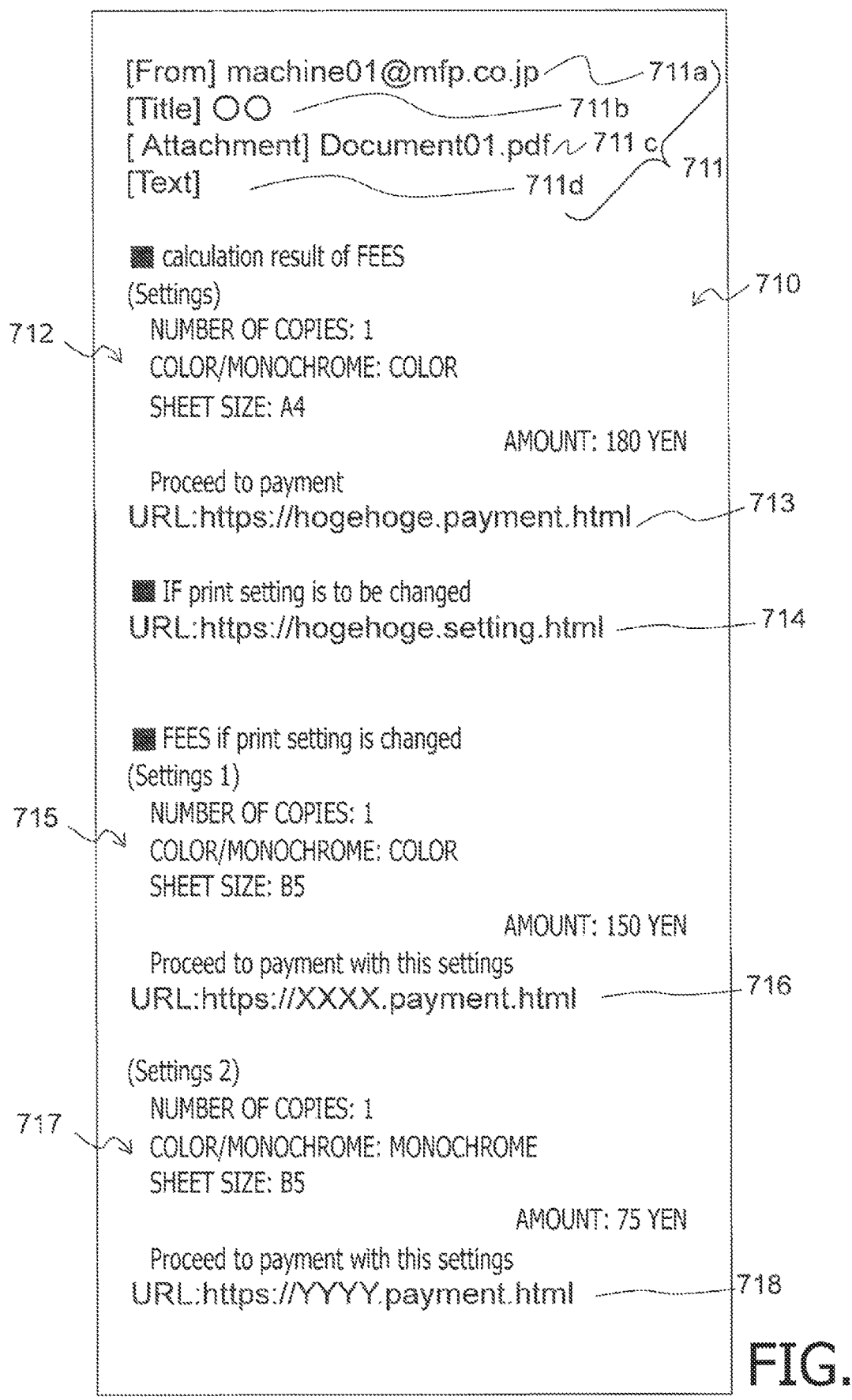
FIG. 6 is an example of a mail receiving screen displayed on the mobile terminal.

Thereafter, in the data processing server 100, the reply email generated in S81 is transmitted to the mobile terminal 300 as a reply to the email received in S41 (S83). The process executed in S83 is an example of an email replying process. The reply email as transmitted is received by the mobile terminal 300 (S85). FIG. 6 shows an example of an email receiving screen displayed by the mailing software on the mobile terminal 300 when the received reply email is opened.

In FIG. 6, the email receiving screen 710 is provided with a transmitted email display field 711, a calculation result display field 712, a payment URL display field 713, a print setting change URL display field 714, and change example display fields 715, 717.

The transmitted email display field 711 is a field for displaying the outline of the email sent from the mobile terminal 300 described above, and includes a transmission source display field 711a, a subject field 711b, an attached file display field 711c, and a body field 711d. In this example, in line with the above description, "machine01@mfp.co.jp," which is the e-mail address of the MFP 200, is indicated in the transmission source display field 711a, and "Document01.pdf" described above is indicated in the attached file display field 711c.

In the calculation result display field 712, the contents of the setting values for the print settings in the setting fields 651, 652, 653 of the aforementioned portal page 650, that is, the number of copies "1," the paper size "A4," and the color setting "color" are indicated. Although not shown in the drawings, the print setting values in the paper type setting filed, the print quality setting filed, the border setting filed and the like, as described above, are also indicated. Further, the amount of payment calculated in S76 above is indicated as "180 yen" in this example. When describing the contents of the reply email, each of the display fields such as 711, 712, and the like, included in the email reception screen 710 may be referred to as simply a "display field of reply email," and the like, as appropriate.

In the payment URL display field 713, the contents of the above Payment URL, that is, in this example, the URL "https://hogehoge.payment.html" and the text "Proceed to Payment" are displayed.

When Payment is Made Without Changing Print Settings

When the user checks the email reception screen 710 and does not change the print setting values as described below, the user clicks "https://hogehoge.payment.html" in the payment URL display field 713 described above by appropriate operation on the mobile terminal 300. Then, in the mobile terminal 300, S92 after S85 above is determined to be Yes, and accordingly, a payment request is transmitted from the mobile terminal 300, which is received by the data processing server 100 (S102). In response to this, the data processing server 100 executes a payment re-reservation process in S99. That is, since the user's approval for the first amount above has been made, a process similar to the process for the first amount in S79 above is performed again. In other words, the aforementioned product ID, the aforementioned authentication information, the aforementioned first amount calculated in S76, and the Confirm URL for confirming the completion of payment are transmitted to the transaction server 400, and the second Payment URL, and the transaction ID are received by the data processing server 100.

After S99 above, in the data processing server 100, the display data of the payment portal page corresponding to the payment request received in S102 is output to the mobile terminal 300, thereby the payment portal page is displayed on the mobile terminal 300 (S103). An example of this payment portal page according to this present embodiment is shown in FIG. 7A.

Figure 7A:
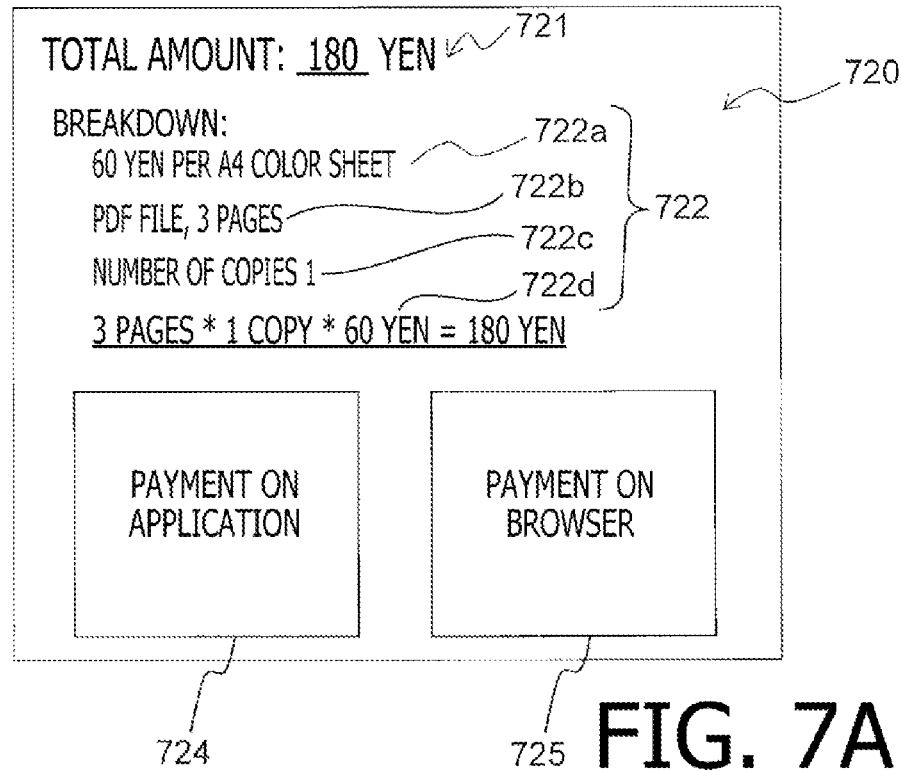
FIGS. 7A and 7B are an example of a payment portal page and an example of a setting change portal page displayed on the mobile terminal.

In FIG. 7A, this payment portal page 720 has a payment amount display field 721, a payment breakdown display field 722, a payment button 724 for the application, and a payment button 725 for the browser.

The payment amount display field 721 shows "180 yen" in this example, in line with the previous example. The payment breakdown display field 722 includes a unit price display field 722a, a file format and the number of pages display field 722b, the number of copies display field 722c, and a calculation formula display field 722d.

In the unit price display field 722a, "60 yen per A4 color sheet" is displayed, corresponding to the unit price of 60 yen for an A4 size sheet of color printing in this example. In the file format and the number of pages display field 722b, "pdf file, 3 pages" is displayed, corresponding to the aforementioned content. In the number of copies display field 722c, "Number of copies 1" is displayed, corresponding to the fact that the number of copies is one. In the formula display field 722d, the formula used when the fee is calculated in response to the above unit price display field 722a, file format/the number of pages display field 722b, and the number of copies display field 722c is displayed as "3 pages*1 copy*60 yen=180 yen" in accordance with the above example.

The payment button 724 for the application is a button for executing online payment on the payment application program associated with the transaction server 400 described above. The browser payment button 725 is a button for executing online payment on a normal browser, not on the payment application program associated with the transaction server 400 described above.

Based on the contents displayed on the above payment portal page 720, the user can know the fee he/she should pay for the use of the service this time. When the user clicks the payment button 724 for the application with appropriate operation on the mobile terminal 300, as shown in FIG. 8 following FIG. 5, a payment approval instruction is given by the user who confirms the contents of the payment amount display field 721 and the payment breakdown display field 722 as described above (S91). As a result, a payment approval notification is transmitted from the mobile terminal 300 to the transaction server 400 on the payment application described above (S105). When the payment button 725 for the browser is clicked, the same as above, a payment approval notification is transmitted from the mobile terminal 300 to the transaction server 400 on the browser (S105).

When Print Settings are Changed as Desired According to the present embodiment, the print setting values can be changed for each of the print files that are to be printed, according to the user's desire. That is, in FIG. 6 described above, the email reception screen 710 is further provided with a print setting change URL field 714 as described above, and in this example, a URL "https://hogehoge.setting.html" is indicated. If the user wishes to change the print settings after checking the contents of the transmitted email display field 711 and the calculation result display field 712, the user clicks on "https://hogehoge.setting.html" in the print setting change URL display field 714. Then, the mobile terminal 300 makes a No decision in S92 after S85, and a Yes decision in S93, and then, a request to obtain the portal page for changing settings is transmitted from the mobile terminal 300 accordingly and received by the data processing server 100 (S94). The data processing server 100 outputs the display data of the portal page corresponding to the request to obtain the portal page for changing the settings to the mobile terminal 300, and the portal page for changing the settings is displayed on the mobile terminal 300 to display the portal page for changing settings (S95).

Figure 7B:
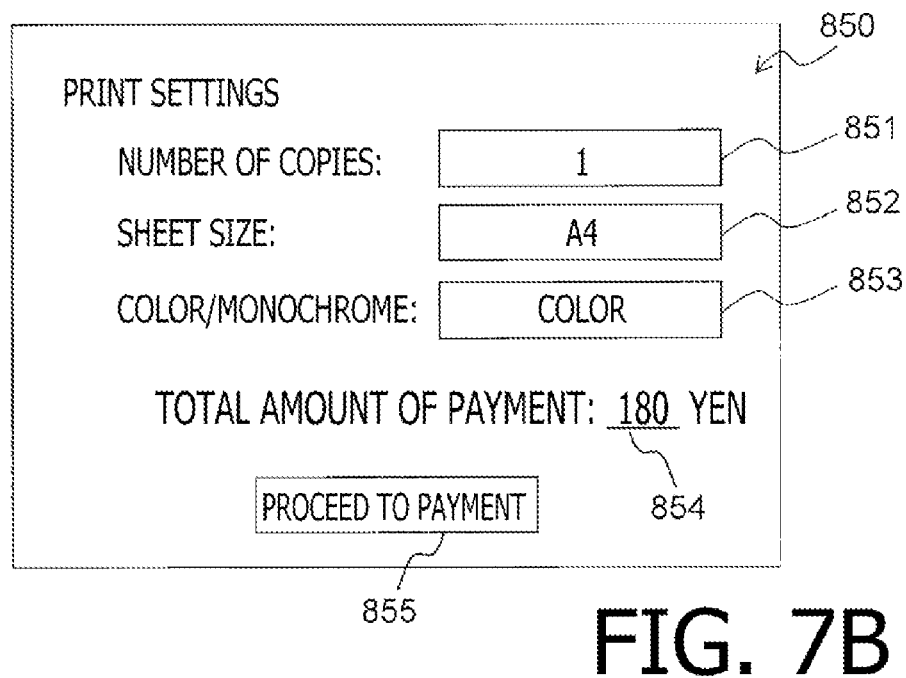

FIG. 7B shows an example of a setting change portal page 850, which is displayed on the mobile terminal 300. This setting change portal page 850, similar to the screen shown in FIG. 3, is provided with, as fields for reconfiguring the above print settings, the number of copies setting field 851 for entering the number of copies to be printed, a paper size setting field 852 for selecting the paper size, and a print color setting field 853 for selecting the print color setting (i.e., the color printing or the monochrome printing). As in the previous description, although not shown in the drawings, there are other fields such as the paper type setting field, the print quality setting field, the border setting field and the like, in addition to the above. In the example shown in FIG. 7B, the state before the user changes the settings is shown, and similar to the previous example, "1" copy is set in the number of copies setting field 851, "A4" size is set in the paper size setting field 852, and "color" is set in the print color setting field 853. Similar to the previous description, the contents of these settings in the respective setting fields 851, 852, and 853 are examples of the print setting values.

Furthermore, in this setting change portal page 850, an amount display field 854 is provided to indicate the amount of the fee corresponding to the contents of the setting fields 851, 852 and 853. In the state before the change, shown in FIG. 7B, "180 yen" is displayed, which has already been calculated in S76 corresponding to the above-mentioned setting values of 1 copy, A4 size, and color.

In this state, if the user changes the contents of at least one of the setting fields 851, 852 or 853 by operating the mobile terminal 300, an instruction to change the print setting values is given (S96), and a reflection request to reflect the change in the print setting values is transmitted from the mobile terminal 300. The transmitted reflection request is received by the data processing server 100 (S97). Thereafter, in the data processing server 100, the print settings are changed in response to the receipt of the reflection request to change the set value, i.e., the print setting value is updated (S89).

Thereafter, the fees at the time of printing corresponding to the above setting value change are recalculated using the same method as is performed in S76 (S98). In other words, the fee is calculated by reflecting the change in print setting values in S89 to the first amount calculated in S76. Thereafter, the display data of the portal page reflecting the results of the setting value change and the fee recalculation described above is output to the mobile terminal 300. In this way, in the mobile terminal 300, the portal page after the change of the print setting values is reflected is displayed (S100). Thereafter, the print setting values changed in S89 are transmitted to the MFP 200, and the print setting values are set to the MFP 200 (S90).

Figure 9:
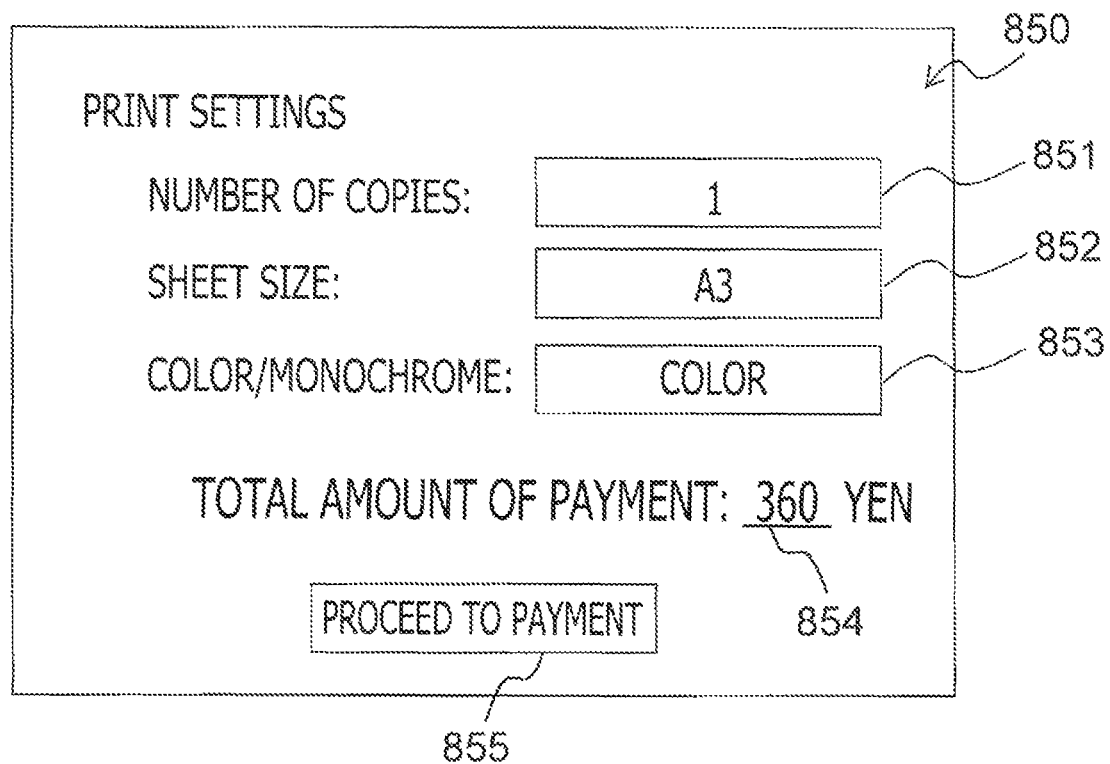
FIG. 9 is an example of the setting change portal page displayed on the mobile terminal.

FIG. 9 shows an example of the setting change portal page 850, when the content of the sheet size setting field 852 is changed, for example, from a state shown in FIG. 7B to "A3" size. In this case, due to the change of the sheet size, the indication in the amount display field 854 has been changed from "180 yen" as described above to "360 yen."

In the setting change portal page 850, shown in FIG. 9(a) or FIG. 9(b), a "Proceed to Payment" button 855 is provided on the page 850 for changing the settings reflecting the changed contents. When the user operates the "Proceed to Payment" button 855, the mobile terminal 300 makes a "Yes" determination in S101 after S100. In response, a payment request from the mobile terminal 300 is received by the data processing server 100 (S102), and the payment rescheduling process is executed in S99. That is, since the user's approval has been given for the second amount, the process similar to the process in S79 is performed again for the second amount. In other words, the product ID, the authentication information, the second amount calculated in S98, and the Confirm URL for confirming the completion of payment are transmitted to the transaction server 400, and the corresponding payment URL and the transaction ID are received by the data processing server 100.

Thereafter, the data processing server 100 outputs the display data of the payment portal page corresponding to the payment request received in S102 to the mobile terminal 300, and the payment portal page is displayed on the mobile terminal 300 (S103). A final confirmation by a user is made to the payment portal page regarding payment of the fee after changing the print setting values as described above. Similar to the previous description, when the user clicks the payment button 724 for the application or the payment button 725 for the browser, the payment approval instruction described with reference to FIG. 8 is made (S91), and a payment approval notification is transmitted from the mobile terminal 300, which is received by the transaction server 400 (S105).

If the "Proceed to Payment" button 855 is not operated on the setting change portal page 850 shown in FIG. 7B, the determination in S101 is "No," the process returns to S93, and the aforementioned process is repeated.

Indication of Example of Change of Print Settings

Returning to FIG. 6, as mentioned above, the email receiving screen 710 is provided with the change example display fields 715 and 717 in which changed examples to change the setting values of the print settings.

In this example, the change example display field 715 shows an example in which, among the contents before the change described in the calculation result display field 712, namely, the number of copies printed "1," paper size "A4," and color setting "color," the paper size is changed from "A4" to "B5." The settings of "1" for the number of copies, "B5" for the paper size, and "Color" for the color setting are examples of the second set of print setting values in this example. It is further indicated that with this change, the payment amount of the above fee is changed to "150" yen. Further, in the change example display field 717, an example of changing the color setting to "monochrome" is shown, and it is also shown that the amount of the fee is changed to "75" yen as a result of the above change. In such a case, the settings for the contents of the number of copies "1", the paper size "B5", and the color setting "monochrome" are examples of the second print setting values in this example.

Below each of the change example display fields 715 and 717, there are provided payment URL display fields 716 and 718, respectively, in which the above-mentioned third Payment URL is indicated. In the payment URL display field 716, the contents of the third Payment URL, in this example, the URL "https://XXXX.payment.html" and the text "Proceed to payment with this setting" are displayed. If a user who has confirmed the contents of the change example display field 715 wishes to change the setting values to the change example and make payment as is, he/she clicks "https://XXXX.payment.html" in the payment URL display field 716. Further, if the user who has confirmed the contents of the change example display field 717 wishes to change the setting values to the change example and make payment as is, he/she clicks on "https://YYYYY.payment.html" in the payment URL display field 718.

With the click, as described above, a Yes determination is made in S92 after S85 in the mobile terminal 300, and accordingly, a payment request is transmitted from the mobile terminal 300 and received by the data processing server 100 (S102). In response, the data processing server 100 executes a payment rebooking process in S99. In this case, since the user has given his/her approval for the second amount, the same processing as in S79 is performed again. In other words, the product ID, the authentication information, the second amount calculated in S76, and the Confirm URL for confirming the completion of payment are transmitted to the transaction server 400, and the third Payment URL and the transaction ID are received by the data processing server 100.

After S99, the data processing server 100 outputs the display data of the payment portal page corresponding to the payment request received in S102 to the mobile terminal 300, and the payment portal page is displayed on the mobile terminal 300 (S103).

Figure 10A:
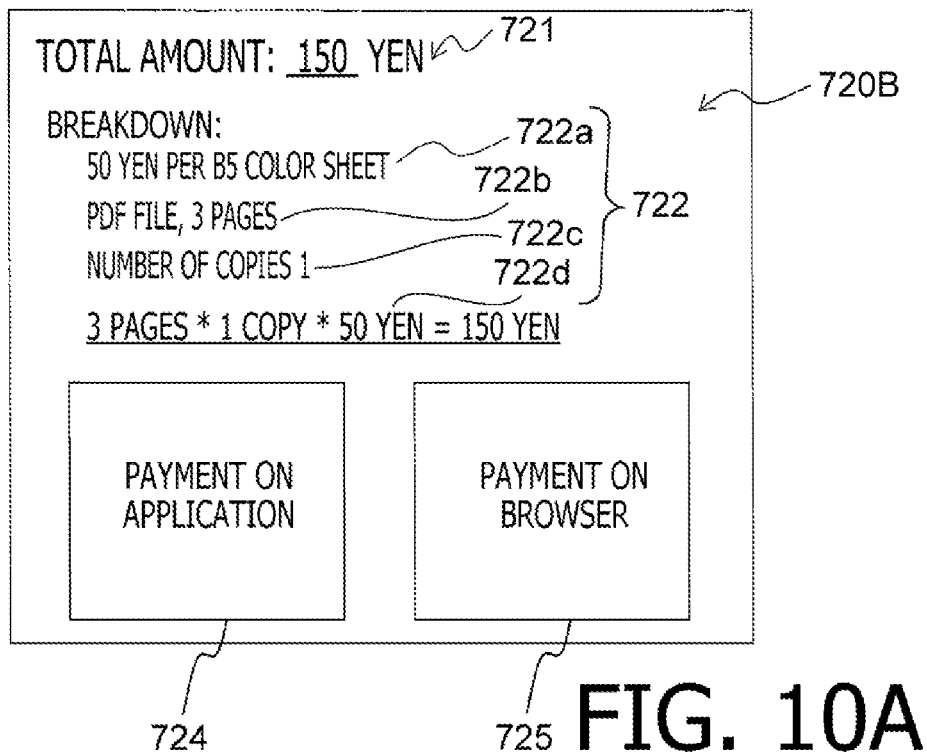

An example of the payment portal page that is displayed when the user clicks "https://XXXX.payment.html" displayed in the payment URL display field 716 is shown in FIG. 10A, corresponding to FIG. 7A. In the payment portal page 720B shown in FIG. 10A, "150 yen" is displayed in the payment amount display field 721, in line with a described content in the change example display field 715. Further, in the payment breakdown display field 722, "50 yen per one B5 sheet in color" is displayed in the unit price display field 722a, "pdf file 3, pages" in the file format/number of pages display field 722b, and "1 copy" in the number of copies display field 722c. Further, in the formula display field 722d, "3 pages*1 copy*50 yen=150 yen" is displayed. Furthermore, a payment button 724 for the application and a payment button 725 for the browser similar to those described above are provided.

Figure 10B:
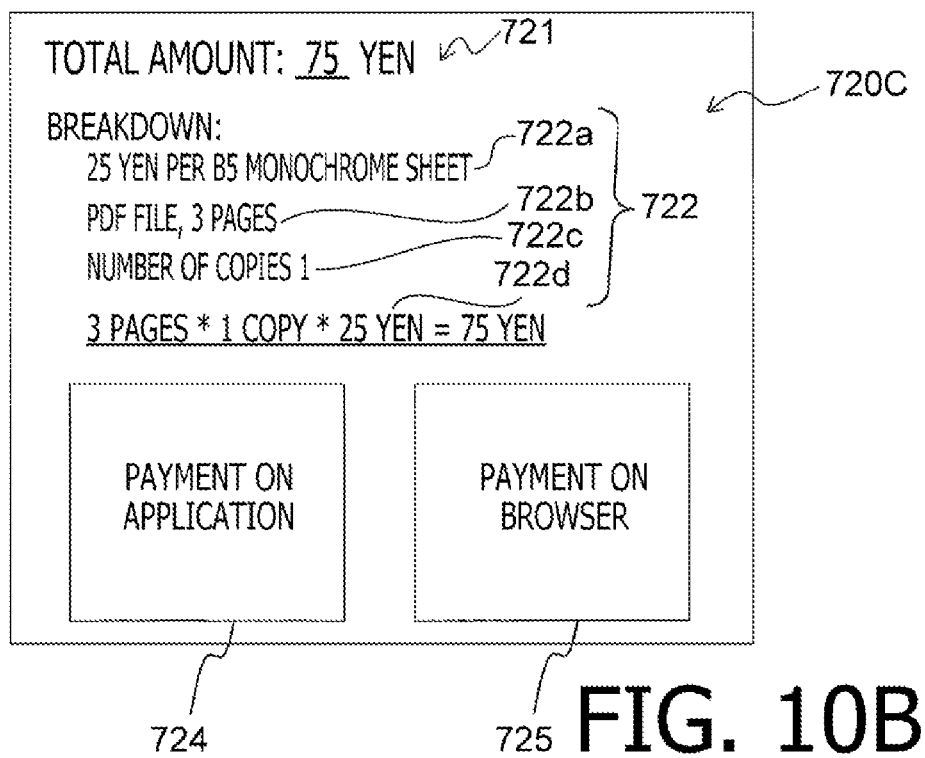

An example of the payment portal page displayed in S103 above when clicking "https://YYYYYpayment.html" in the above payment URL display field 718 is shown in FIG. 10B, corresponding to FIG. 7A above. In the payment portal page 720C shown in FIG. 10B, "75 yen" is displayed in the payment amount display field 721, in line with the description in the change example display field 717. In the payment breakdown display field 722, the unit price display field 722a shows "25 yen per one B5 sheet in monochrome," the file format and the number of pages display field 722b shows "pdf file, 3 pages," and the number of copies display field 722c shows "1 copy." Further, "3 pages*1 copy*25 yen=75 yen" is displayed in the formula display field 722d. Furthermore, a payment button 724 for the application and a payment button 725 for the browser are provided.

Figure 8:
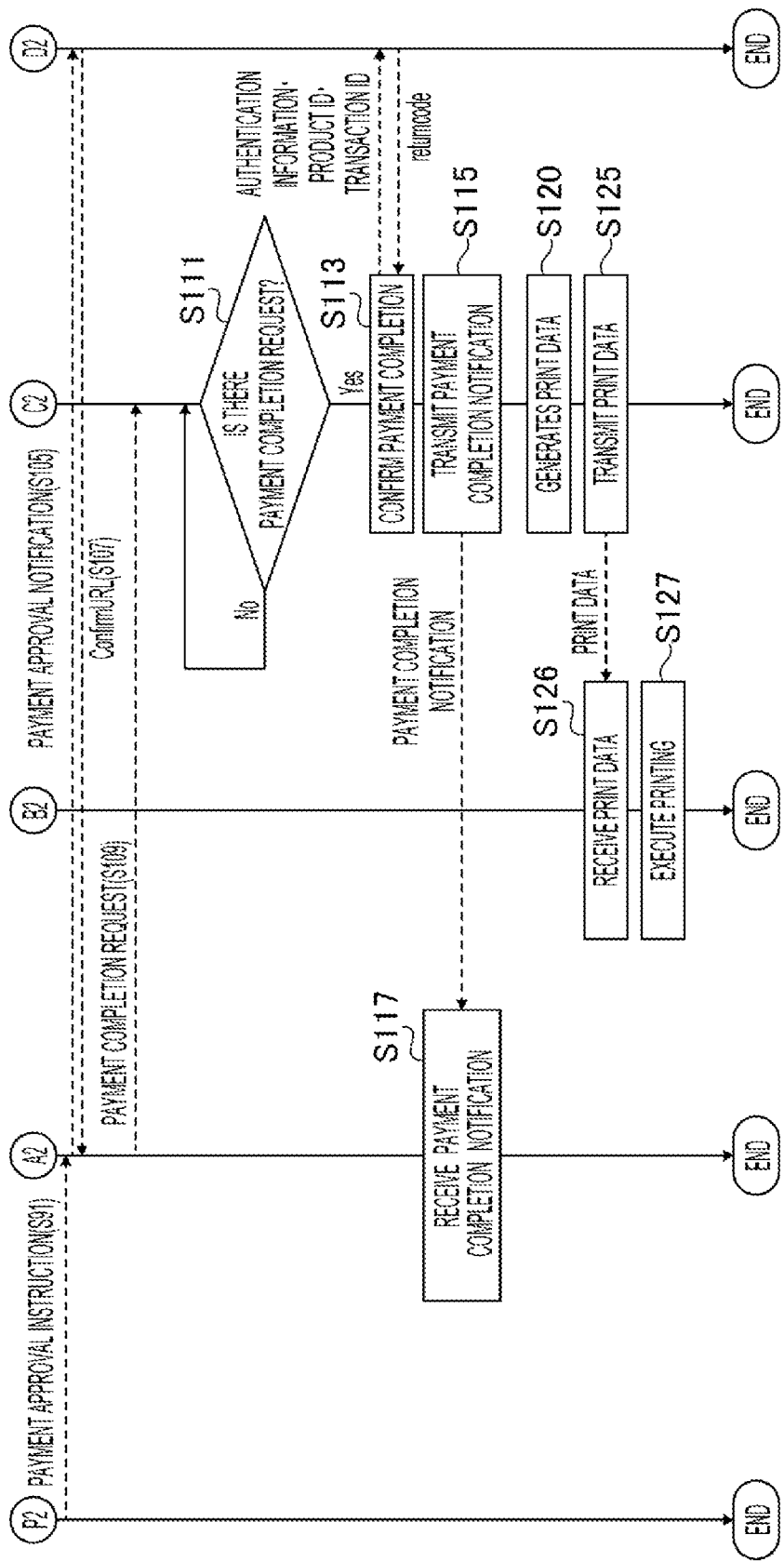
FIG. 8 is a sequence chart illustrating processes performed by the mobile terminal, the MFP, the data processing server and the transaction server.

When the user clicks the payment button 724 for the application or the payment button 725 for the browser on the payment portal page 720B in FIG. 10A and the payment portal page 720C in FIG. 10B, a payment approval instruction in FIG. 8 is issued, as described above (S91), and a payment approval notification is sent from the mobile terminal 300 to the transaction server 400 (S105).

In the example shown in FIG. 6, the first amount, second amount, and each Payment URL, and the like calculated in S76 were directly described in the body of the return email, but the configuration is not necessarily limited to the above. For example, although not shown in the drawings, at least one of the first amount, second amount, and each Payment URL may be listed in the subject line of the reply email. Alternatively, at least one of the above may be listed in the "CC" or "BCC" field, or at least one of the above may be listed in a web page, or the like, that is an access destination and indicated in the "CC" or "BCC" field.

After the processes up to S105 in FIG. 8 have been executed as described above, the transaction server 400 that receives the approval notification transmits the Confirm URL corresponding to the Payment URL at the time of the settlement reservation (S79) to the mobile terminal 300 (S107). Based on the Confirm URL, the mobile terminal 300 transmits a payment completion request, which is received by the data processing server 100 (S109). In this way, a Yes determination is made in S111 by the data processing server 100, and the payment completion confirmation process is performed (S113). That is, the authentication information, the product ID, and the transaction ID corresponding to the Confirm URL are transmitted to the transaction server 400.

Further, the return code transmitted, in response, from the transaction server 400 is received by the data processing server 100.

After the payment completion confirmation process, the data processing server 100 transmits a payment completion notification (S115), which is received by the mobile terminal 300 (S117). Then, the data processing server 100 generates the print data (S120) such that a particular conversion is performed on the image data contained in the print file attached to the email received in S41, and if, by this point of time, any print setting changes have been made to the print settings initially received in S33, the changes are reflected. Thereafter, the print data based on the print file received in S41 is transmitted from the data processing server 100 (S125), which is received by the MFP 200 (S126). The above print data may be data of the print file itself or rasterized data for printing. The process executed in S125 is an example of a first information transmitting process. Further, the process executed in S126 is an example of a data obtaining process.

The method is not limited to a method to transmit print data directly from data processing server 100 to the MFP 200, as in the process in S125 and S126 above, but other methods may also be used. That is, for example, in response to the data processing server 100 receiving a payment completion confirmation notification from the transaction server 400, the data processing server 100 may store the print data in an appropriate external device connected to the network NT. In such a case, the data processing server 100 transmits a data obtaining instruction including access information such as the URL of the above-mentioned external device to the MFP 200 afterwards. The MFP 200 receives the transmitted data obtaining instruction. Upon receipt of the data obtaining instruction, the MFP 200 accesses the external device via the network NT to obtain the print data from the external device. In this case, the process of the data processing server 100 transmitting the data obtaining instruction is another example of the first information transmitting process. Furthermore, the process by which the MFP 200 obtains print data from the external device is another example of the data obtaining process.

Thereafter, in the MFP 200, the print engine 290 prints the image data corresponding to the print data received in S126 on the paper (S127). In such a case, based on the print setting values received in S33, such as the print setting values in the setting fields 651, 652, 653, and the like of the print setting portal page 650 described above, or the print setting values generated in S75 and described in the change example display fields 715, 716, or the print setting values after the settings are changed in S89, the printing is performed. The process executed in S127 is an example of the first printing process. Thereafter, this sequence flow is terminated.

Effects of Embodiment

As described above, in the printing system 1 according to the present embodiment, print data is obtained in S126, and an image corresponding to the print data is formed on the paper by the print engine 290 based on the print setting values. The fee charged when the print engine 290 forms an image on the paper is determined in S76. At that time, in S76, a plurality of fees are determined, each representing the fees when the multiple print setting values are applied, corresponding to the content received in S33 and the changed examples generated in S75, respectively. Thus, according to the present embodiment, a plurality of fees corresponding to the applying of the multiple print setting values are determined, thereby presenting to the user a plurality of fees corresponding to the multiple print setting values.

Further, in the present embodiment, in particular, the first print setting values that has already been set prior to the image formation, in the above embodiment, the print setting values by the user, are obtained in S33. In S75, new second print setting values, which is different from the first print setting values that was obtained, is newly generated. In S76, the first fee corresponding to the first print setting value and the second fee corresponding to the second print setting value are determined. In this way, according to the present embodiment, the first fee corresponding to the first print setting values that have been set and the second fee corresponding to the second print setting values that are different from the first print setting values are determined, so that multiple fees corresponding to multiple print setting values can be presented to the user.

Further, in the present embodiment, the so-called email printing is performed. An email transmitted from the mobile terminal 300 with an attached print file to be printed is received in S41. In this email, the print setting values related to the print setting of the print file made by the user accessing the first URL above are included. When this email is received, the fee charged for forming an image based on the attached print file is determined in S76. Further, in the present embodiment, the email also contains at least one changed example of the print setting values generated in S75, a second amount of the fee for image formation based on the changed example, and a third Payment URL for the payment page to settle the payment with the second amount. In this way, the user can access the third payment URL described in the email received in S85 with the mobile terminal 300 (S103), and pay the second amount for image formation using the above changed example of the print setting values by electronic payment (S91 to S117). When the payment of the second amount is completed, in S125, the print data based on the print file or the destination information of the print data is transmitted to the MFP 200, and in S127, image formation is performed by applying the print setting values of the changed example to the print data. As described above, according to the present embodiment, multiple fees corresponding to multiple print setting values can be presented to the user, the multiple fees including a first amount for image formation at the user's print setting value determined in advance (S31) and a second amount for image formation in accordance with the print setting values of the changed example (S75). The user can execute the email print according to the print settings determined in advance or the print settings of the changed example.

This first embodiment is not necessarily limited to the above-described configuration, but various modifications are possible within the scope of not departing from its purpose and technical concept. Such modifications are described below. Parts similar to those in the first embodiment above are assigned with the same symbols, and the explanation will be omitted or simplified as appropriate.

As described above, it is necessary to perform a particular conversion on the image data contained in the print file. This conversion involves multiple stages of processing that differ from each other and further, the processing varies depending on what data format the original image data is in. Correspondingly, the timing of execution of a process with a longer execution time and a process with a relatively shorter execution time among the multiple-stage processes may be performed separately. That is, for items that take a relatively long time to convert, such as the number of copies, the paper size, the print color setting, and the bordering, as described above with reference to FIG. 3, the conversion process is executed at a relatively early stage to generate print data, while for the paper type and the print quality, the conversion process may be executed at a relatively late stage.

Further corresponding to the above, in S75, only changed examples of print setting values related to the process with longer execution time may be generated. In such a case, the processing to be performed between the finalization of the print setting values and the start of printing can be minimized, and the time required for such processing can be reduced.

Hereinafter, a second embodiment of the present disclosures will be described with reference to FIGS. 11-20. As in the first embodiment above, the present embodiment is also configured such that a print service, in which the user (i.e., the customer) pays a fee to use the printing function of the MFP 200, is performed, and the user transmits a print file to be printed to the MFP 200 via a PC terminal connected to the network. The transmission of the file causes the MFP 200 to print the print file, and the process related to the payment of the printing fee is further carried out by so-called electronic payment as in the first embodiment described above. Parts equivalent to those in the first embodiment and the modifications are assigned with the same symbols, and descriptions thereof are abbreviated or simplified as appropriate.

Overview of Printing System

Figure 11:
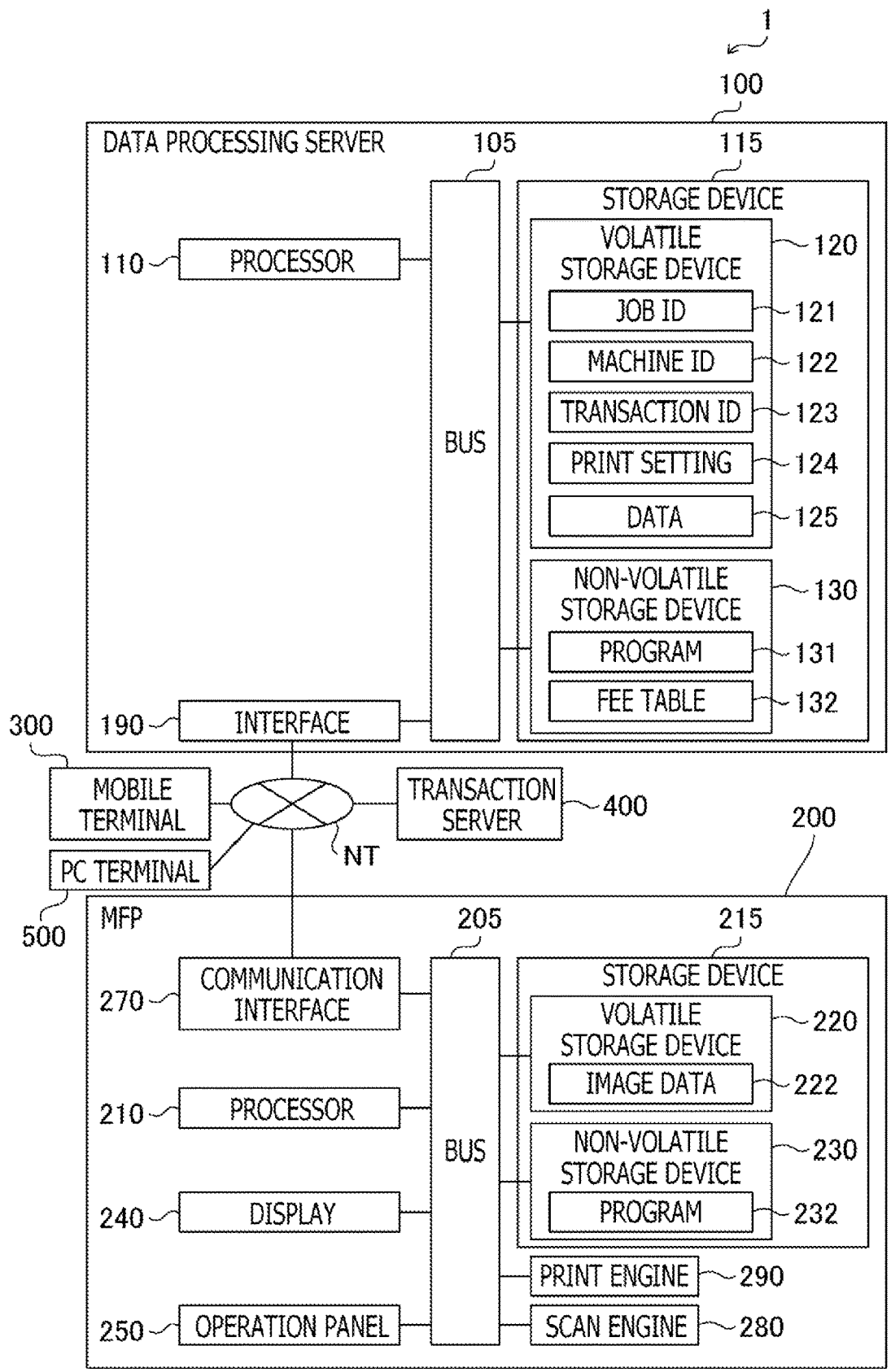
FIG. 11 is a block diagram of an overall configuration of a printing system.

The printing system 1 according to the present embodiment is shown in FIG. 11 that corresponds to FIG. 1 for the first embodiment. The printing system 1 shown in FIG. 11 and according to the present embodiment includes the data processing server 100, the MFP 200, the mobile terminal 300, and the transaction server 400 described above, and further a PC terminal 500. In the present embodiment, the PC terminal 500 is an example of an external device. The PC terminal 500 is connected to the network NT in the same way as the data processing server 100, the MFP 200, the mobile terminal 300, and the transaction server 400 are connected as described above. The data processing server 100, the MFP 200, the mobile terminal 300, the transaction server 400, and the PC terminal 500 are configured to communicate with each other.

The PC terminal 500 is installed in the user's office or home in this example, and is connected to the network NT via a wireless or wired communication. The PC terminal 500 has a processor, a storage device, a display device, an operation panel, and an interface for connecting to the network NT (not shown). Further, in the present embodiment, the volatile storage device 120 is provided with a job ID storage area 121 and a machine ID storage area 122. The respective storage contents will be described in detail later.

Process Flow

In the printing system 1 with the above configuration, a so-called PC printing is performed such that a print file transmitted from the PC terminal 500 is received by the MFP 200 and then transmitted to the data processing server 100. In the present embodiment, the above print file is transmitted and received as a print job that includes the image data to be printed and the print commands for printing the image data. Hereafter, the details of the above PC printing performed in the present embodiment will be explained in turn. In the present embodiment, the control procedures representing the processes executed by the processor 210 of MFP 200, the processor 110 of data processing server 100, the processor of the transaction server 400, the processor of the mobile terminal 300 will be described with reference to FIGS. 12, 14, 17 and 19. As in the first embodiment, in the following description referring to FIGS. 14, 17 and 19, the description of respective processors will be omitted, that is, expressions "in the processor of the MFP 200," "by the processor of the MFP 200" and the like are expressed as "in the MFP 200," "by the MFP 200" and the like.

Print Settings and Fee Calculation

Figure 19:
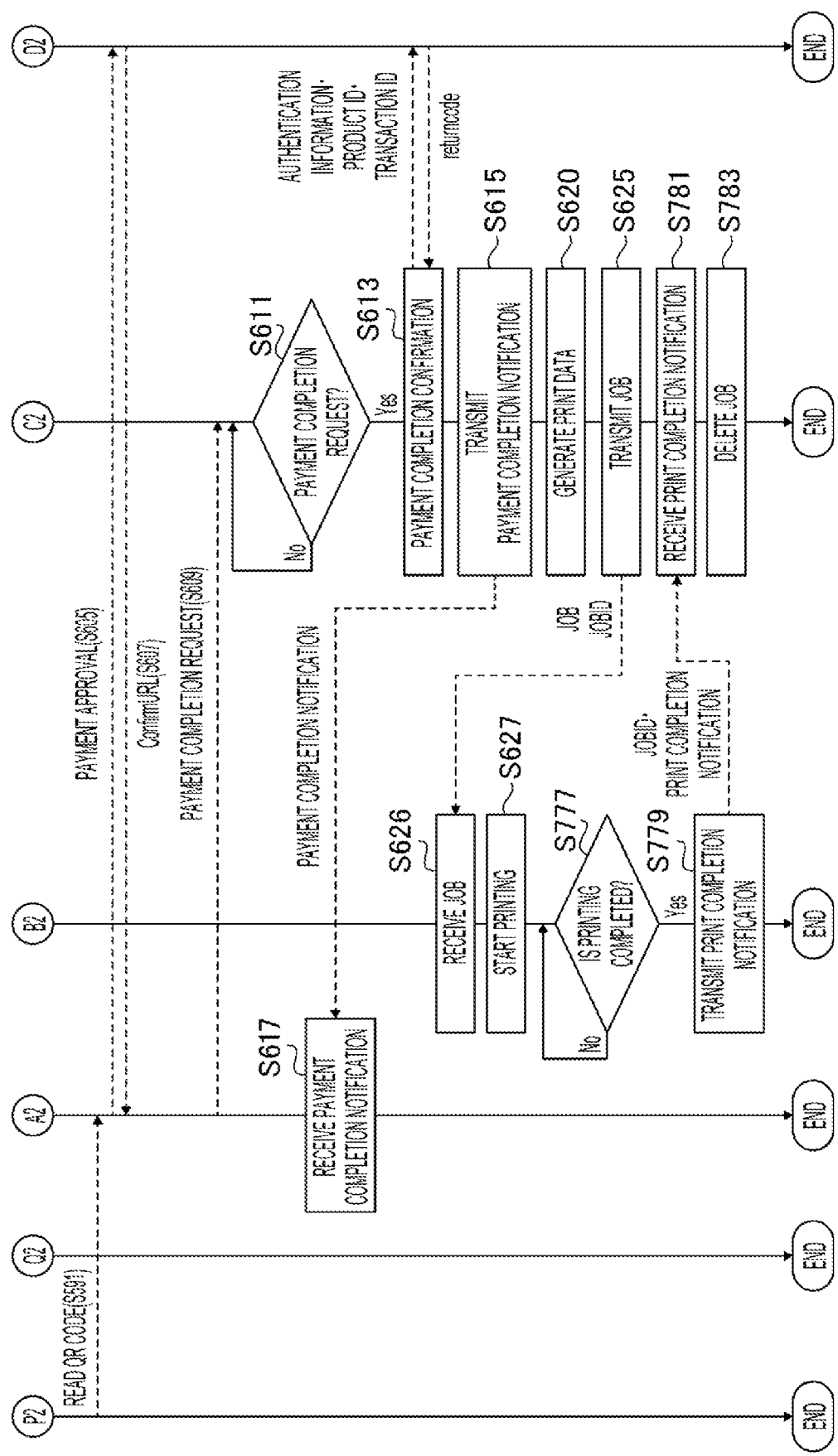
FIG. 19 is a sequence flow illustrating processes performed by the PC terminal, the mobile terminal, the MFP, the data processing server and the transaction server.

In FIG. 19, first, the user opens an appropriate print setting value input screen (not shown) by appropriately operating the operation panel of the PC terminal 500, and inputs the respective print setting values that the user wants to set individually for the print job including image data prepared in advance for printing (S501). With this configuration the PC terminal obtains the print settings. For example, like the print setting portal page 650 displayed on the mobile terminal 300 in the first embodiment, this print setting value input screen includes, as fields for print settings, the number of copies setting field for inputting the number of copies to be printed, the paper size setting field for selecting the paper size, the print color setting field for selecting the print color setting (i.e., color or monochrome), the paper type setting field for selecting the paper type (i.e., plain paper or glossy paper, etc.), the print quality setting field for selecting "plain" or "clean" mode, and the border setting field for selecting the printing with or without borders. In the present embodiment, the contents set in all the setting fields are examples of print setting values, and in particular, the print setting value entered in S501 is an example of the first print setting value. The print setting values are not limited to those expressed in numerical values, but also include setting factors that are expressed in non-numerical forms, such as kind and type, and can be selected or designated by the user.

The print settings input as described above are received by the PC terminal 500 (S502), then transmitted to the MFP 200, and received by the MFP 200 (S503). The process executed in S503 is an example of a print setting value obtaining process. The obtained print settings are further transmitted from the MFP 200 (S504) and received by the data processing server 100 (S505). The received print settings are stored in the print setting storage area 124. The process performed in S504 is an example of the print setting value transmitting process, the process performed in S505 is an example of the first print setting value receiving process.

Thereafter, in S575, the data processing server 100 generates at least one changed example using an appropriate method, which is a change made by the PC terminal 500 to the print setting values received in S505. The generated changed example of the print setting values is an example of the second print setting values. The generated print setting values are stored in the print setting storage area 124 in the same manner as above. The process performed in S575 by the processor 110 of the data processing server 100 is an example of the first print setting value generating process. The details of the changed example at this time will be described later.

Thereafter, in S543, the fees to be charged to the user for printing the image data included in the print job are calculated based on the contents of the multiple print settings, or multiple print setting values, for the aforementioned print job stored in the print setting storage area 124, respectively. The fee calculated in correspondence with the above first print setting values received in S505 is an example of the first fee, and the fee calculated in correspondence with the second print setting values generated in S575 is an example of the second fee. Further, the process performed in S543 is an example of the third fee determining process, and the processor 110 of the data processing server 100 that performs S543 is an example of the fee determining process in the present embodiment. In this calculation, for example, the fee is calculated based on the aforementioned fee table stored in the fee table storage area 132 of the volatile storage device 120.

The result of the fee calculation in S543 above is transmitted from the data processing server 100 (S506) and obtained by the MFP 200 (S507). The process performed in S506 is an example of a fee transmitting process. The obtained fee calculation result is further transmitted from the MFP 200 and received by the PC terminal 500 (S508). Based on the results of reception, the PC terminal 500 displays the fee for the printing execution of the printing job, i.e., the above first fee, on the fee display screen of the display device (S509).

Figure 13A:
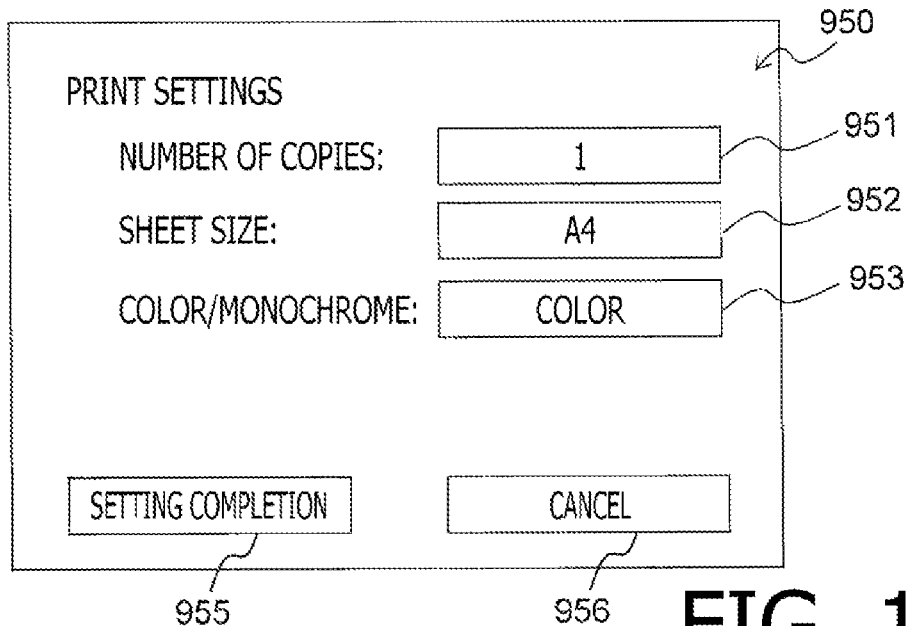
FIGS. 13A and 13B are examples of a fee display screen and a fee list display screen displayed on a display device of the PC terminal.

FIG. 13A shows an example of the fee display screen 950 that is displayed on the display device in S509. As shown in the drawing, the fee display screen 950 includes the number of copies setting field 951 for entering the number of copies to be printed, the paper size setting field 952 for selecting the paper size, and the print color setting field 953 for selecting the print color setting, i.e., for selecting the color printing or the monochrome printing. Further, the fee display screen 950 includes "Setting Completion" button 955 and "Cancel" button 956. As in the previous description, although not shown in the drawings, there are other fields such as the paper type setting field, the print quality setting field, and the border setting field, and the like in addition to the above. In the example shown in the drawing, "1" copy is set in the number of copies setting field 851, "A4" size is set in the paper size setting field 852, and "color" is set in the print color setting field 853. Further, the fee display screen 950 is provided with an amount display field 954, which indicates the amount of the first fee calculated in S543 in correspondence with the contents of the setting fields 951, 952, 953, and the like. In the example shown in the drawing, "180 yen" is displayed, which has been calculated in S543, corresponding to the above-mentioned setting values of 1 copy, A4 size, and color print.

Figure 13B:
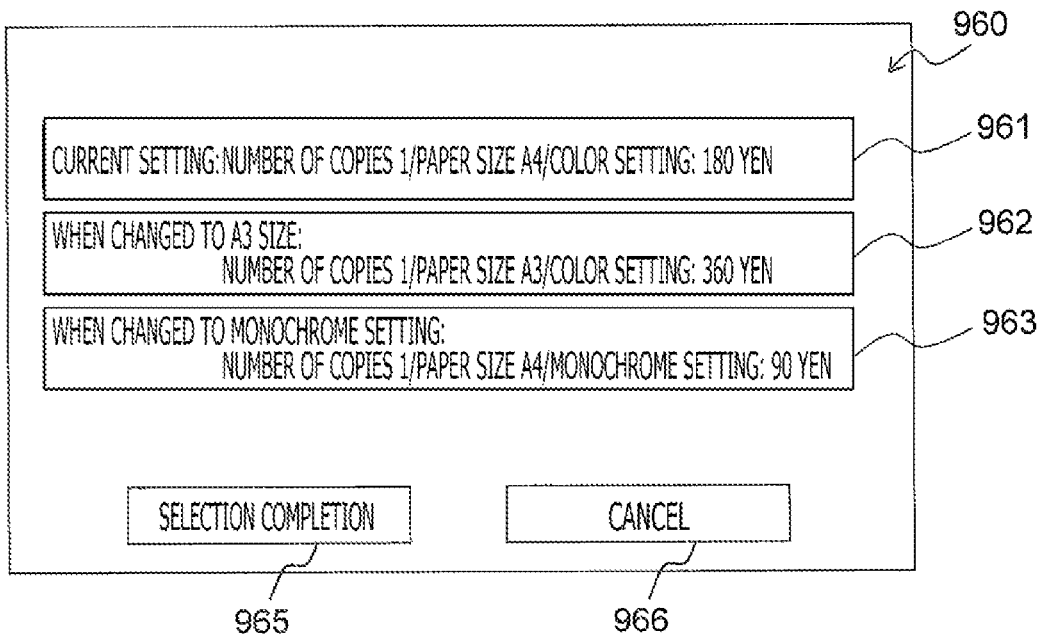

A user who sees the fee display on the display device confirms the first fee and operates the operation panel of the PC terminal 500 accordingly to operate to input "Setting Completion" (S510: Yes). Then, the process in the PC terminal 500 moves to S511, and the second fee related to the aforementioned changed example of the setting values, which was generated in S575 and calculated in S543, is displayed on the display device together with the first fee. FIG. 13B shows an example of the fee list display screen 960 that is displayed on the display device at this time.

As shown in FIG. 13B, the fee list display screen 960 is provided with a current setting display button 961 and change setting display buttons 962 and 963. It is noted that only one changed setting display button may be provided as shown in the drawing, or three or more changed setting display buttons may be provided instead of two, depending on the number of the changed examples generated in S575.

The current setting display button 961 has an indication of "current setting" and indications "Number of copies 1/Paper size A4/Color: 180 yen" which represents the content of the print setting values at this point and the corresponding first fee.

In this example, for the a set of the first print setting values of the one copy, the A4 paper size, and the color print setting, one set of the second print setting values of one copy, A3 paper size A3, and color print setting, and another set of the second print setting values of one copy, A4 paper size, and monochrome print setting have been generated in S575 as described above. Further, for the two set of second print settings, second amounts of 360 yen and 90 yen are calculated in S543, respectively. Correspondingly, the change setting display button 962 has an indication of "when changed to A3 size" and the indication of "Number of copies 1/Paper size A3/Color print setting: 360 yen" representing the content of the corresponding second print setting values and the corresponding second fee. The change setting display button 963 has an indication of "when changed to monochrome setting" and "Number of copies 1/Paper size A4/Monochrome setting: 90 yen" representing the content of the corresponding second print setting values and the corresponding second fee. In this example, the second print setting values for one printed copy, paper size A3, and color print setting generated in S575 are 360 yen, which is higher than the first fee, and the second print setting values for one printed copy, paper size A4, and monochrome print setting are 90 yen, which is lower than the first fee above. The configuration is not limited to the above, and in S575, only the second print setting values that give a second fee that is less than or equal to the first fee may be generated as changed examples.

When the user operates one of the buttons 961, 962, or 963 to finally select the corresponding print setting values, and then operates the "Selection Completion" button 965 below the buttons 961 to 963 (S512: Yes), the process moves to S521 onward in FIG. 14 described later.

When the user operates the "Cancel" button 956 on the fee display screen 950 (S510: No) or the "Cancel" button 966 on the fee list display screen 960 (S512: No), the process returns to S501. In this way, until the user enters the "Setting Completion" operation input on the fee display screen 950 and operates the "Selection Completion" button 965 on the fee list display screen 960, the user can redo the print settings any number of times by repeating S501 to S511. The operation of the "Selection Completion" button 965 on the fee list display screen 960 is an example of a particular operation related to the selection of the first or second fee.

Transmission/Reception of Print Job

When the user operates the "Selection Completion" button 965 on the fee list display screen 960 (S512: Yes), the result of the selections made with the button 961, 962 or 963 described above, i.e., which print setting values were selected, is notified to the MFP 200 and further to the data processing server 100 (S513, S514). Thereafter, the process moves to FIG. 14, and as the user operates the operation panel of the PC terminal 500 as appropriate, the instruction is given to the PC terminal 500 to transmit the print job with the above-mentioned print settings (S521). At the same time, the user inputs his/her user ID and a PIN code to secure the above print job into the PC terminal 500. This operation can be performed, for example, via a printer driver or application installed on the PC terminal 500.

In response, the above print job, the PIN code, and the user ID are transmitted from the PC terminal 500 (S523). The transmitted print job, and the like is received and obtained by the MFP 200 (S524). The print jobs obtained in S524 are sequentially stored in the data storage area 222 after obtaining the same. The process performed in S524 is an example of the print job obtaining process.

The MFP 200 transmits the print job received in S524, together with the machine ID of the MFP 200 and the user ID received in S524 (S533). The process performed in S533 is an example of a first print job transmitting process.

The data processing server 100 receives (S535) the print job, the user ID, and the machine ID transmitted from the MFP 200 in S533. The process performed in S535 is an example of a first print job receiving process. Thereafter, in the data processing server 100, a JOB ID is generated (S540), and the print job received in S535 is associated with the generated JOB ID and the machine ID, which has already been received in S535, and stored in the data storage area 125 (S542). The process performed in S542 is an example of a print job storage process. The JOB ID is information to identify the job, in other words, to identify the image data.

Thereafter, in S544, the data processing server 100 issues a product ID for the execution of the service to print the print job received in S535. In other words, this product ID is generated individually for each print job.

Then, in S545, the print job, the corresponding machine ID, the product ID generated in S544, and the fee calculated in S543 are associated with each other. As a result, the print job, the JOB ID, and the machine ID are stored and registered in the data storage area 125 of the volatile storage device 120, the JOB ID storage area 121, and the machine ID storage area 122, respectively, in a manner associated with the fee and the product ID (S545). At this time, the print job, the JOB ID, and the machine ID are stored in a manner associated with the user ID received in S535.

Then, the data processing server 100 transmits, in S547, a registration completion notification indicating that the registration was completed in S545, which is received by the MFP 200 (S549).

The procedure from S521 to S549 is executed each time a print job is transmitted from the PC terminal 500 in S521. At that time, each time the print job is received in S535, the print job is stored and accumulated in the data storage area 125. Therefore, the number of the print jobs stored in data storage area 125 is not limited to one, but multiple print jobs may be stored in the data storage area 125. In other words, at least one print job is stored in the data storage area 125 in a manner associated with a corresponding JOB ID and a corresponding machine ID, respectively.

After S549, the MFP 200 stands by (S553) until the MFP 200 receives an instruction to display a registered job list, which will be described later. When the user operates the operation panel 250 of the MFP 200 appropriately in a state where at least one print job has been accumulated in the data storage area 125, if the user gives an instruction to display a list of print jobs already registered with the data processing server 100, the corresponding display instruction is received by the MFP 200 (S551). As a result, the determination in S553 is made Yes, and the registration job list request is transmitted from the MFP 200 to the data processing server 100 (S555).

When receiving the registered job list request, the data processing server 100 generates, in response, a list of at least one print job that has been accumulated and registered in the data storage area 125 (S557), based on the machine ID of a requesting MFP 200 as described above. The generated registered job list is transmitted in S559, and is received by the MFP 200 (S560).

After receiving the instruction to display a list of the print jobs, the MFP 200 displays an appropriate user ID input screen (not shown) on the display 240 in response to the receipt of the registered job list in S560. In the state where the user ID input screen is displayed on the display 240, when the user performs an appropriate operation on the operation panel 250 to input his/her own user ID (S561), the operation is received by the MFP 200.

Then, a registered job list containing only the print jobs corresponding to the user ID among the print jobs already registered with the data processing server 100 as described above is displayed on the display 140 (S563). In the following description, "input is made by operation through the operation panel 250" to the screen displayed on the display 240 as described above is simply referred to as "input is made to the screen" of the display 240. Similarly, "an operation, selection, or designation is made via the operation panel 250" on a button, a key, or a display shown on the display 240 is simply referred to as "a button or key is operated," "a button or key is clicked," or the content corresponding to the displayed name is "selected or designated" on the display 240.

Figure 15:
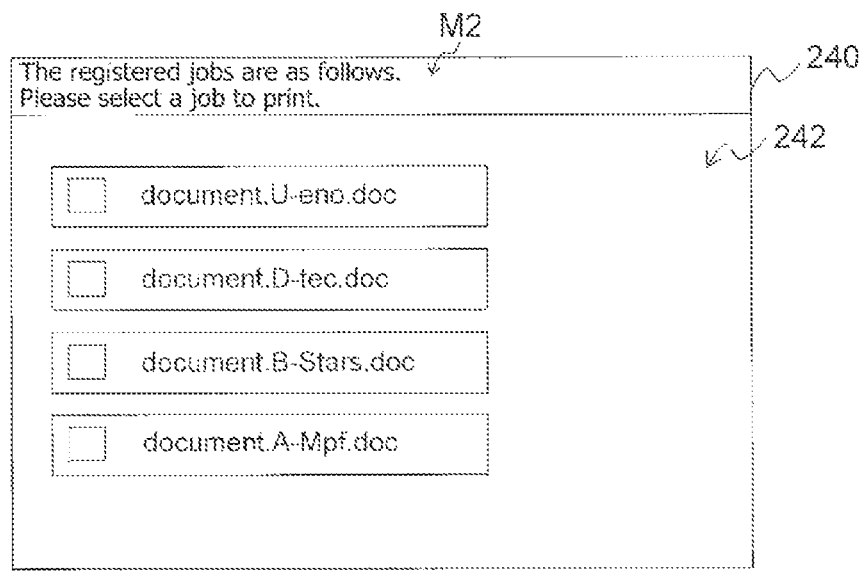
FIG. 15 is an example of a registered job list display screen displayed on a display of the MFP.

An example of the registered job list displayed on the display 140 as described above is shown in FIG. 15. In FIG. 15, a registered job list display screen 242 is displayed on the display 140, and on the registered job list display screen 242, a message "The registered jobs are as follows. Please select a job to print" and identification information of multiple print jobs related to the user ID, in this example, the file names of the jobs, are displayed in the list. This print job identification information is an example of information about the print job. In the example shown in the FIG. 15, four print jobs with file names "document.U-eno.doc," "document.D-tec.doc," "document.B-S5tarS5.doc," and "document.A-Mpf.doc" are selectively displayed as candidates for printing. As mentioned above, for the image data of each of the four print jobs, the print settings are made for each print job in S501-S505 of FIG. 12.

In the state where the registered job list display screen 242 is displayed, when the user designates a desired print job by checking a checkbox next to the file name of the job (S565), the designation is received by the MFP 200 (S567). Although the user can designate one print job in S565, multiple print jobs may be designated.

When designation of one of the print jobs is made, the MFP 200 displays an appropriate PIN code entry screen (not shown) on the display 240. On the PIN code entry screen, the user re-enters the PIN code which was entered in S521 when the print job designated in S565 was transmitted (S569). Then, the PIN code is received by the MFP 200 (S571), the designation of the print job is established, and the details of the file information of the designated print job are displayed (S572).

Figure 16:
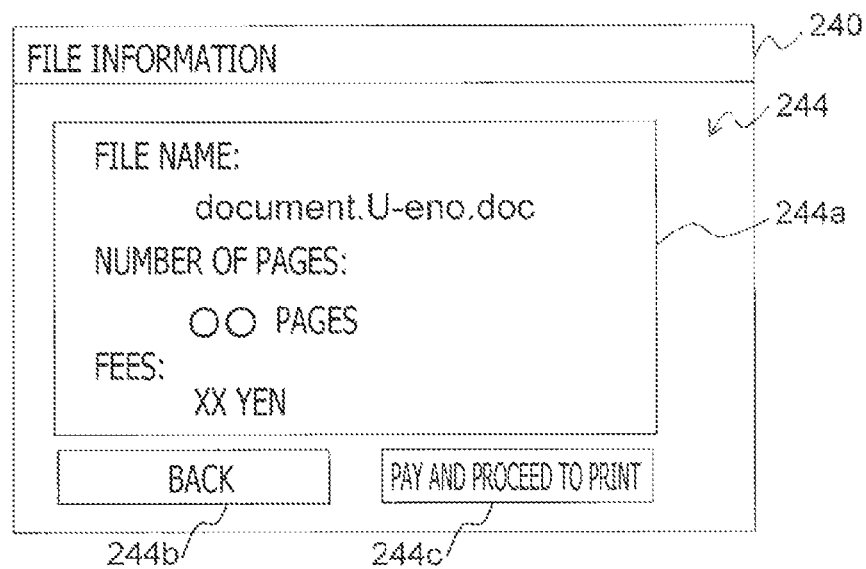
FIG. 16 is an example of a file information display screen displayed on the display of the MFP.

An example of the file information for a print job displayed on the display 140 as described above is shown in FIG. 16. In FIG. 16, the file information display screen 244 is shown on the display 140, and in this case, the print job with the aforementioned file name "document.U-eno.doc" is designated as an example. As shown in FIG. 16, in this file information display screen 244, there is provided a file information display field 244a, a "Back" button 244b, and a "Pay and Proceed to Print" button 244c.

In the file information display field 244a, the file name "document.U-eno.doc," the number of pages in the file of the print job, and the fee charged for executing the print job are displayed as file information. The fee is transmitted by the data processing server 100 so that the information on the amount calculated in S543 is included in the job, for example, and is obtained by the MFP 200.

When the user operates the "PAY AND PROCEED TO PRINT" button 244c, the operation is the final print execution instruction from the user to the MFP 200 (S574). As a result of the operation, a print request corresponding to the print execution instruction is transmitted (S575) from the MFP 200, together with the designation information representing the result of the designation of one of the above print jobs and the machine ID, and is received by the data processing server (S100).

Thereafter, the process moves to FIG. 23, and in response to the printing request of S575, the data processing server 100 recalculates, in S576, the amount of the payment fee charged to the user for this printing service, i.e., printing of the one print job designated above, based on the result of the designation of the one print job received in S575. Also in this case, the fee is calculated, for example, based on a particular fee table as described above. The process performed in S576 is also an example of the third fee determining process.

Thereafter, in S578, the fee calculated in S576 and the product ID issued in S544 for the designated print job are registered in the data processing server 100 in an associated manner (S578).

Next, in S579, the data processing server 100 performs a payment reservation process. Concretely, the product ID associated with a designated print job, the user's payment amount that is the result of the calculation in S576, authentication information to be used for authentication at the transaction server 400, and the URL for confirming the completion of payment (in the present embodiment, the URL of the data processing server 100), are sent to the transaction server 400. Further, the Payment URL for the user to access to pay the fee and the transaction ID related to the fee payment procedure, which are transmitted from the transaction server 400 in response to the above transmissions, are received by the data processing server 100.

Thereafter, in the data processing server 100, the payment amount, which is the result of the calculation in S576, and the transaction ID and the Payment URL obtained in S579 are associated with the JOB ID described above (S581). Then, in accordance with a known and appropriate method, a barcode corresponding to the Payment URL, e.g., a QR code, is generated (S583), and the data necessary for payment, including the QR code, is transmitted to the MFP 200 having the corresponding machine ID described above (S585).

The data required for payment includes the QR code, the above Payment URL and the JOB ID, which are received by the MFP 200 (S587). In the MFP 200 that receives the above data, a particular payment screen displaying the data necessary for the above payment, including at least the aforementioned QR code, is displayed on the display 240 (S589).

Figure 18:
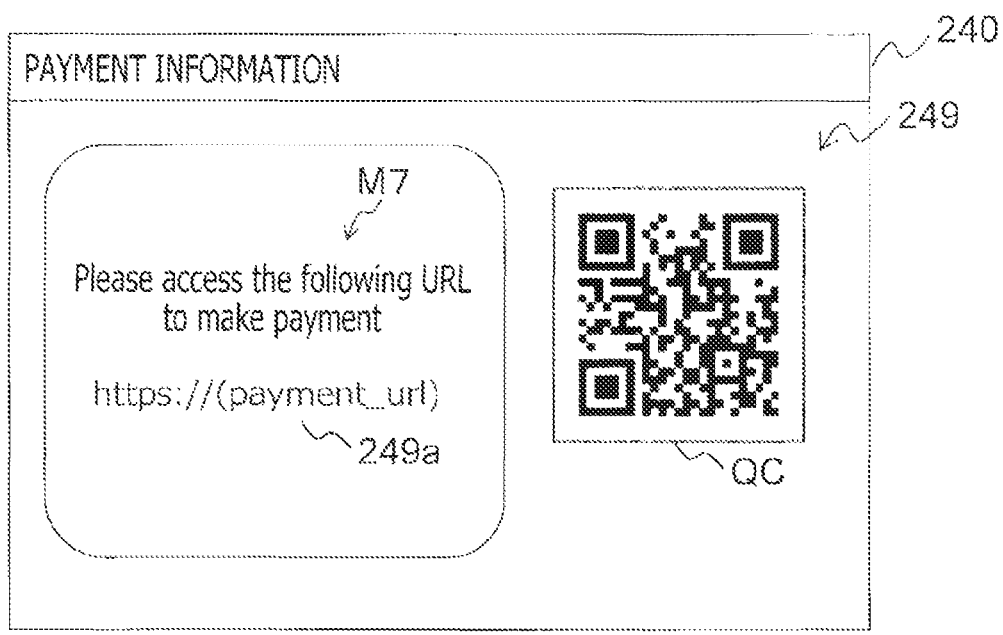
FIG. 18 is an example of a payment screen displayed on the display of the MFP.

An example of the payment screen is shown in FIG. 18. The payment screen 249 shown in FIG. 18 displays the QR code QC, a message M7 that reads "Please access the following URL to make payment." and a URL display field 249a that displays a URL indicating the access destination.

Then, the process moves to FIG. 19, and the QR code QC displayed on the payment screen 249 is read with a scanner or a camera provided to the mobile terminal 300 (S591). In this way, a screen displaying the Payment URL (not shown) is displayed on the mobile terminal 300. By accessing the Payment URL displayed on the Payment URL display screen, the fee display screen including the calculated fees, and the like are displayed, and the user can know the fees to be paid for the use of the printing service this time.

Thereafter, the user who sees the fee performs an appropriate operation on the fee display screen displayed on the mobile terminal 300. As a result, the mobile terminal 300 notifies the transaction server 400 (S605) of a payment approval notification indicating that the payment process is approved, or in other words, that the user accepts the payment of the fee.

Next, the transaction server 400, which received the above notification of approval, transmits the Confirm URL corresponding to the Payment URL at the time of the payment reservation (S579) to the mobile terminal 300 (S607). Then, based on this Confirm URL, the mobile terminal 300 transmits a payment completion request, which is received by the data processing server 100 (S609). In this way, the data processing server 100 makes a Yes decision in S611, and the payment completion confirmation process is performed (S613). In other words, the aforementioned authentication information, product ID, and transaction ID corresponding to the Confirm URL are transmitted to the transaction server 400. Further, a return code transmitted, in response, from the transaction server 400 is received by the data processing server 100. After the payment completion confirmation process, the data processing server 100 transmits the payment completion notification (S615), which is received by the MFP 200 (S617).

Thereafter, the data processing server 100 performs a particular conversion on the image data contained in one of the print jobs received in S535, which is designated in the job designation information in S575 and for which the fee has been paid as described above, and then print data is generated (S620), reflecting the selection result of the print setting values received in S514. If the print settings have been changed at least once as described above, the print data is generated at S620 so that the print data reflects the latest print setting values after the change. After the print data is generated in this way, the print job will include the aforementioned print command and the print data.

Thereafter, one print job containing the generated print data is transmitted from the data processing server 100 (S625), which is received by the MFP 200 (S626). In this case, the print data may be the print file data itself, or it may be rasterized data for printing. The process performed in S625 above is an example of the second print job transmitting process, and the process performed in S626 is an example of the second print job receiving process.

Then, in the MFP 200, the print engine (290) executes the print job received in S626 and starts printing on the paper (S627). The process executed in S627 is an example of the second printing process.

When the MFP 200 makes a Yes determination in S777 as execution of the printing is completed, a print completion notification is transmitted with the JOB ID in S779. In response, in the data processing server 100, after the transmitted print completion notification and the JOB ID are received (S781), the print job corresponding to the received JOB ID and held in the data storage area 125 is deleted (S783). Thereafter, this sequence flow is terminated.

Effects of Embodiment

As described above, in the printing system 1 according to the present embodiment, the print data is obtained in S626, and an image corresponding to the print data is formed on the paper by the print engine 290 based on the print setting values. The fee charged when the print engine 290 forms an image on the paper is determined in S543. At that time, in S543, multiple fees, three in the aforementioned example, are determined, which represent the fees for forming an image by applying multiple sets of the print setting values, respectively (see FIG. 13B). According to the present embodiment, as in the first embodiment, multiple fees corresponding to the sets of the multiple print setting values, respectively, are determined in S543, so the multiple fees corresponding to the multiple sets of the print setting values can be presented to the user (FIG. 13B).

In the present embodiment, in particular, the first print setting values that have been set prior to the image formation, in the above embodiment, the print setting values set by the user, are obtained in S505. In S575, the second print setting values different from the first print setting values that have been obtained are generated. In S543, the first fee corresponding to the first print setting values and the second fee corresponding to the second print setting values are determined. As a result of the above, according to the present embodiment, it is possible to determine the first fee corresponding to the first print setting values that have been set and the second fee corresponding to the second set print setting values different from the first print setting values, so that multiple fees corresponding to multiple print setting values can be presented to the user.

In the present embodiment, in particular, when the second print setting values are generated in S575, the second fee corresponding to the values can be generated to be lower than the first fee corresponding to the first print setting values, as described above. In such a case, the second print setting values can be presented to the user as an alternative candidate that would result in a smaller economic burden than the case in which the first print setting values are applied.

In the present embodiment, in particular, when the first print setting values related to the print settings of the print job are transmitted from the PC terminal 500 prior to transmitting the print job, the first print setting values are obtained in S503 and transmitted to the data processing server 100 in S504. In the data processing server 100, the second print setting values different from the first print setting values received in S505 are newly generated in S575. Thereafter, the first fee corresponding to the first print setting values received in the first print setting value receiving process and the second fee corresponding to the second print setting values newly generated are determined in S 543, and the first and second fees are transmitted to the MFP 200 in S506.

The steps S575, S543 and S506 are repeated until the "Selection Completion" button 965 is operated on the PC terminal 500. In this way, when the user enters the first print setting values via the PC terminal 500, the second print setting values corresponding to the first print setting values are generated, and the second fee corresponding to the second print setting values is transmitted to the MFP 200 together with the first fee corresponding to the first print setting values. As a result, as the MFP 200 transmits the first and second fees and the second print setting values to the PC terminal 500 in S508, the PC terminal 500 can present the first and second fees together with the corresponding first and second print setting values to the user (S511).

Thereafter, when the "Selection Completion" button 965 is operated on the PC terminal 500 and the print job is transmitted (S523), the print job is obtained by the MFP 200 (S524) and then transmitted to the data processing server 100 to be received thereby (S535). The received print job is stored in the data processing server 100.

Thereafter, when the user approves the first or second fee determined in S543 above and a payment authorization is transmitted from the PC terminal 500 (S605), the print job stored in the data processing server 100 is retrieved and transmitted to the MFP 200 (S625). The transmitted print job is received in S626, and then the image is formed by the print engine 290 based on the first or second print setting values in S627.

As described above, according to the present embodiment, multiple fees corresponding to multiple print setting values can be presented to the user, including the first amount for image formation with the first print setting values transmitted from the PC terminal 500 and the second amount for image formation with the second print setting values different from the first print setting values (S511). The user can execute a so-called PC print according to the first print setting values set in advance or the newly generated second print setting values.

This second embodiment is not necessarily limited to the above-mentioned configuration, but various modifications are possible within the scope of and not departing from its object and technical concept. Such modifications are described below. Parts equivalent to those of the first and second embodiments are assigned with the same symbols, and the description is omitted or simplified as appropriate.

For example, in the second embodiment, the data processing server 100 uses the fee table to calculate fees for the print job in S543, but instead, the PC terminal 500 may obtain the fee table to calculate the fees. In such a modification, main parts of the control procedure representing the process performed by the processor 210 of the MFP 200, the processor 110 of the data processing server 100, the processor of the transaction server 400, and the processor of the mobile terminal 300 will be described with reference to FIG. 20, which corresponds to FIG. 12.

Figure 20:
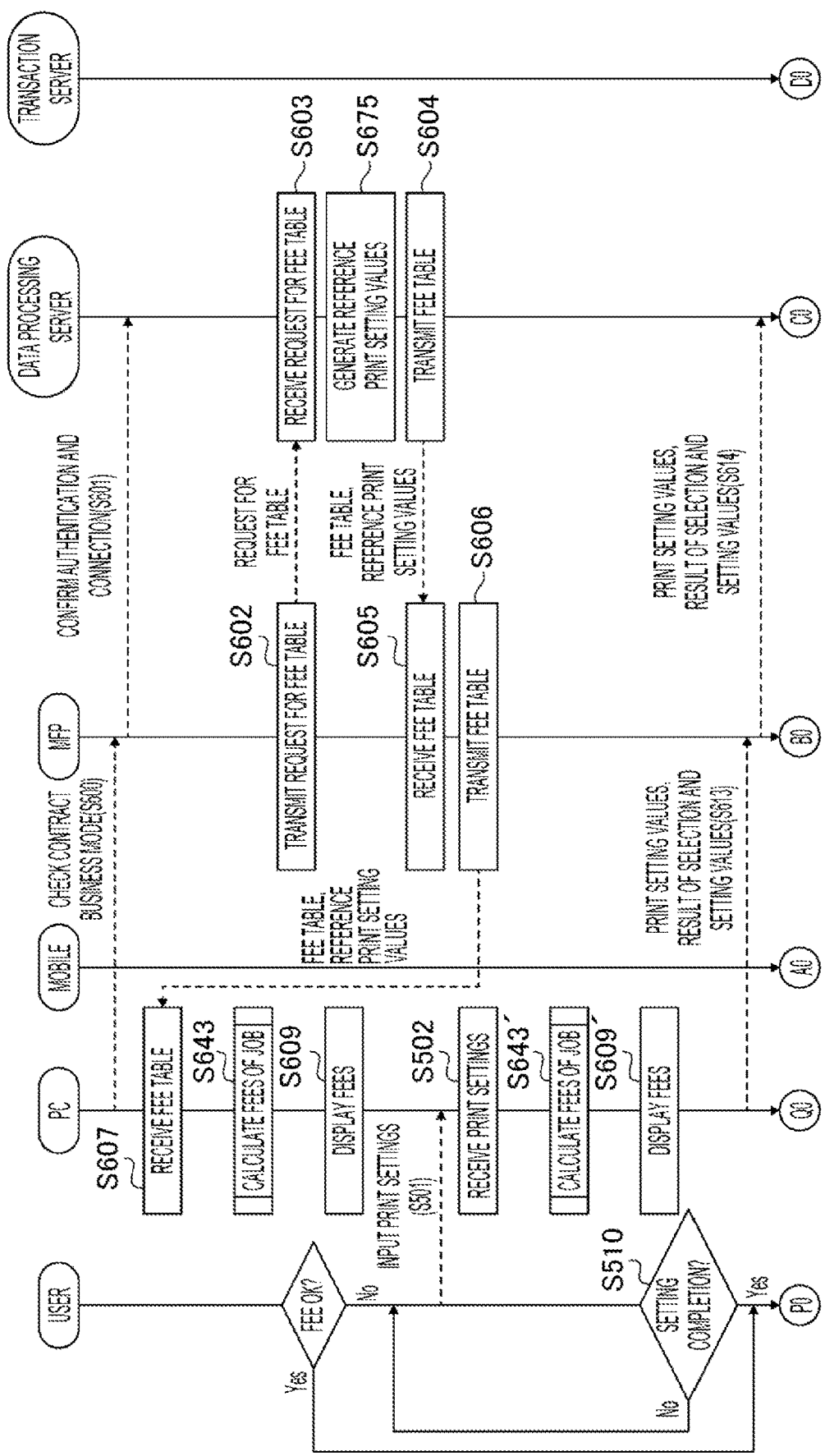
FIG. 20 is a sequence flow illustrating processes performed by the PC terminal, the mobile terminal, the MFP, the data processing server and the transaction server, according to a modification in which the PC terminal is configured to obtain a fee table and perform the fee calculation.

In FIG. 20, first, in S600, the user operates appropriately the operation panel of the PC terminal 500 to cause the PC terminal 500 to check the MFP 200 to determine whether or not the MFP 200 is in the contracted business mode where a contract for the aforementioned printing service has been concluded (S600). The appropriate operation on the operation panel at this time is an example of a particular operation on the external device and is also an example of the first particular operation. Thereafter, authentication is performed by transmitting information, which has been determined in advance, for authentication from the MFP 200 to the data processing server 100, and the connection between the MFP 200 and the data processing server 100 is confirmed (S601). With this authentication, it is guaranteed that the fee table transmitted from the data processing server 100 to the PC terminal 500 via the MFP 200 is authentic, as described below, and the substitution by a malicious third party can be avoided.

Then, a request to transmit the fee table is transmitted by the MFP 200 (S602) and is received by the data processing server 100 (S603). Thereafter, the data processing server 100 generates multiple sets of reference print setting values to be proposed to the user as reference values for the print setting values to be applied during the printing of the print job to be performed thereafter (S675). These multiple sets of the reference print setting values are different from each other. Among the multiple reference print setting values, one of the multiple sets of the reference print setting values includes a print setting value which is an example of a third print setting value, and another sets of the of the multiple reference print setting values includes a print setting value which is an example of a fourth print setting value. Concrete examples of the reference print setting values are described below. The generated reference print setting values are stored in the print setting storage area 124 in the same manner as those described above. The process executed in S675 is an example of the second print setting value generating process.

Thereafter, in response to receipt of the transmission request for the fee table, the data processing server 100 retrieves the fee table stored in the fee table storage area 132 and transmits the retrieved fee table to the MFP 200 (S604). At that time, the set of the reference print setting values including the third setting value and the set of the reference print setting values including the forth print setting value generated in S675 are also transmitted. The process performed in S604 is an example of the second information transmitting process. After receiving the transmitted fee table and reference print setting values (S605), the MFP 200 further transmits the same to the PC terminal 500 (S606). The process executed in S605 is an example of the first information obtaining process, and the process executed in S606 is an example of the third information transmitting process. The PC terminal 500 obtains the fee table and the reference print setting values as transmitted (S607). The process performed in S607 is an example of the second information obtaining process.

Thereafter, in S643, using the aforementioned fee table received in S607, the fees to be charged to the user when the image data contained in the print job is printed based on each of the multiple sets of the reference print setting values received in S607 are calculated, respectively. The fee calculated in response to the set of the reference print setting values including the third print setting value received in S607 is an example of a third fee, and the fee calculated in response to the set of the reference print setting values including the fourth print setting value received in S607 is an example of a fourth fee. Further, the process performed in S643 is an example of the fourth fee determining process.

Thereafter, in S609, the PC terminal 500 displays the multiple fees corresponding to each of the multiple sets of the reference printing setting values calculated in S607 on the fee list display screen of the aforementioned display device. An example of the fee list display screen 970 displayed on the display device at this time is shown in FIG. 21.

Figure 21:
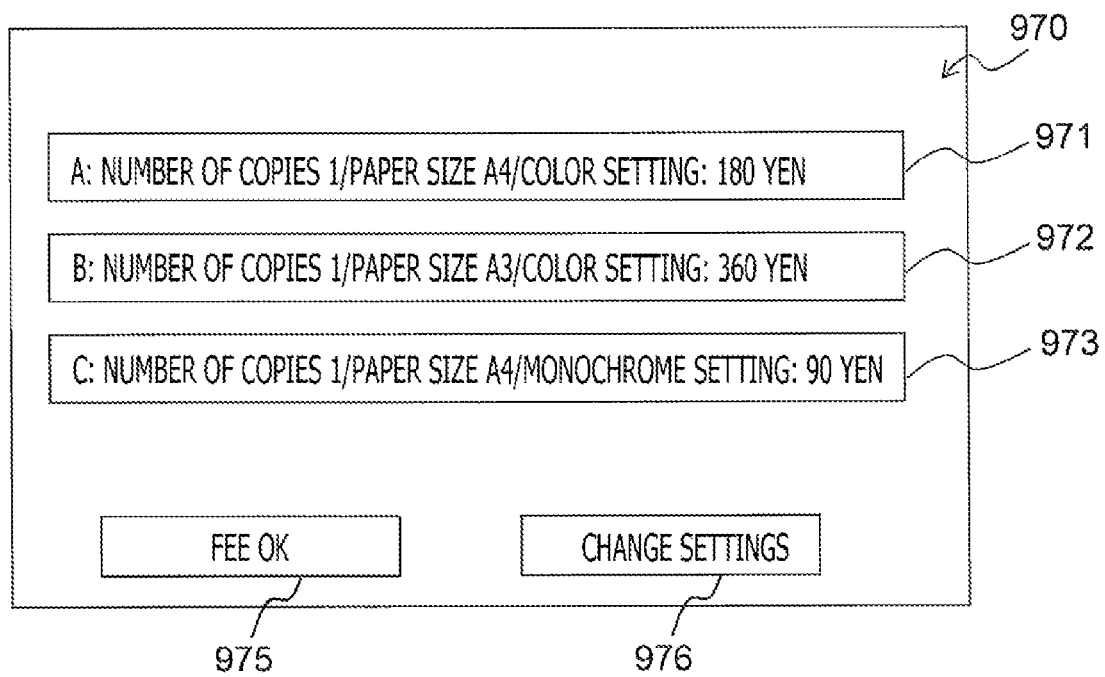
FIG. 21 is an example of the fee list display screen which is displayed on the display device of the PC terminal.

In FIG. 21, the fee list display screen 970 is provided with the first print setting value display button 971, the second print setting value display button 972, and a third print setting value display button 973. These setting value display buttons may be two instead of three as shown in the drawing, or four or more, depending on the number of sets of the reference print setting values that were generated in S675. This example shows a case where three sets of reference print setting values are set in S675.

The first print setting value display button 971 has an indication of "A:" corresponding to the first one of the three sets of reference print setting values as described above, and an indication of "Number of copies 1/Paper size A4/Color 180 yen" indicating the contents of the print setting values and the corresponding fee. The contents of the print setting values are, for example, the same as the most recently used print setting values applied to the print engine 290 at this point in time. That is, corresponding to the fact that printing was performed by the print engine 290 based on the most recent print setting values such as the number of copies is 1, the paper size is A4, and the print color setting is color, the same print setting values are generated as one of the multiple sets of the reference print setting values in S675.

The second print setting button 972 has an indication "B:" corresponding to the second one of the three sets of the reference print setting values as described above, and an indication of "Number of copies is 1/Paper size is A3/Color 360 yen" indicating the contents of the print setting values and the corresponding fee. The contents of the print setting values are, for example, compatible with the consumable information provided in the print engine 290 or the MFP 200 at this point in time. A compatible case is, for example, a case where the paper size information, which is one of the consumable information, indicates that the paper provided in the paper feeding tray of the MFP 200 represents A3. Further, the compatible case is, for example, a case where the remaining ink amount information, which is one of the consumables information, in respective ink cartridges provided in the print engine 290, is sufficient for all colors, and color printing can be performed properly. The print setting values corresponding to the contents of such various consumable information are generated as one of the multiple sets of the reference print setting values in S675.

The third print setting button 973 has an indication of "C:" corresponding to the fact that it is the third one of the three sets of the reference print setting values as described above, and "Number of copies is 1/Paper size is A4/Monochrome 180 yen" indicating the contents of the print setting values and the corresponding fee. The contents of this print setting values are the same as those of the print setting values that are most frequently applied to the print engine 290 within, for example, a particular period of time. In other words, in response to the fact that the print engine 290 printed the largest number of copies based on the print setting values of 1 copy, paper size of A4, print color setting of monochrome, and the like during the particular period, the same print setting values are generated as one of the multiple sets of the reference print setting values in S675.

If the user who has seen the contents of the above three print setting buttons 971, 972, and 973 determines that any the print setting values can be used for printing, the user operates the "Fee OK" button 975 with any set of the corresponding print setting buttons 971 to 973 being selected (S610: Yes). In such a case, as in the second embodiment, the process moves to S521 and onward in FIG. 14. The operation of the "Fee OK" button 975 is an example of a second particular operation in this modification. If the user has determined to change the print setting values based on the print setting values of the indicated contents of the print setting value display buttons 971, 972, and 973, rather than proceed to print with the print setting values of the contents indicated on those buttons, the user operates a "change settings" button 976 (S510: No). In this way, on the display device of the PC terminal 500, the print setting screen 980, for example, shown in FIG. 22A, is displayed.

As shown in the drawing, the print setting screen 980 has a number of copies setting field 981 to enter the number of copies to be printed, a paper size setting field 982 to select the paper size, and a print color setting field 983 to select the print color setting, i.e., whether the color or monochrome print is to be performed. As in the previous description, although not shown in the drawings, there are other fields such as the paper type setting field, the print quality setting field, and the border setting field, and the like, in addition to the above. The example shown in FIG. 22A shows the state where the "change settings" button 976 is operated after the second print setting value display button 972 is selected, but before any changes are made by the user. In the example shown in FIG. 22A, the number of copies setting field 981 is set to "1," the paper size setting field 982 is set to "A3" size, and the print color setting field 983 is set to "color". In the print setting screen 980, there is an amount display field 984, which indicates the amount of the fee corresponding to the contents of the setting fields 981, 982 and 983. In a state where the change has not been made as shown in FIG. 22A, the amount "360 yen," which has been calculated in S76 in correspondence to the setting values of one copy, A3 size, and color.

Figure 12:
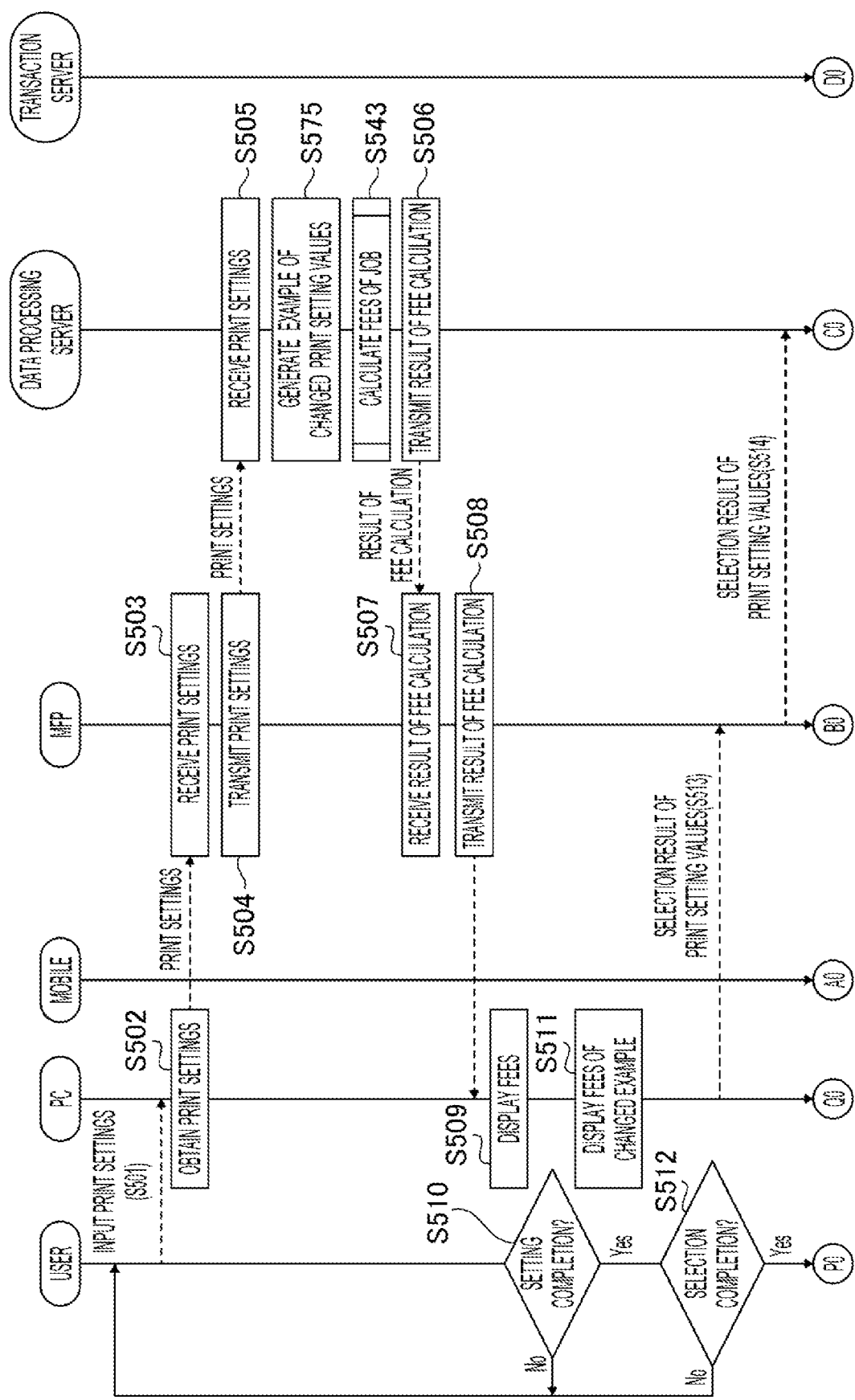
FIG. 12 is a sequence chart illustrating processes performed by a PC terminal, a mobile terminal, an MFP, a data processing server and a transaction server.
Figure 22A:
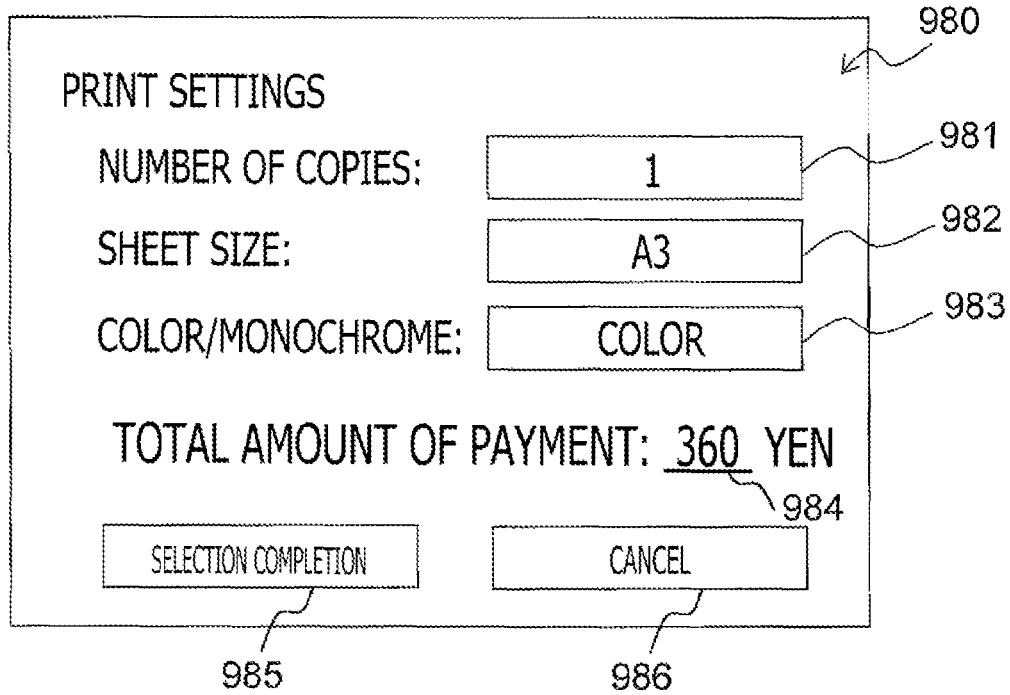
FIGS. 22A and 22B are examples of the print setting screen which is displayed on the display device of the PC terminal.

In the state where the print setting screen 980 shown in FIG. 22A is displayed, the user enters the print setting values to be set to the print job (S501), as is shown in FIG. 12. The user re-enters the print setting values for any of the setting fields 981, 982, 983 and the like on the print setting screen 980, for which the user wishes to replace the contents. After inputting the information, when the "Setting Completion" button 985 on the print setting screen 980 is operated, the entered print setting contents are received by the PC terminal 500 (S502). Thereafter, in S643', which corresponds to S643 described above, the PC terminal 500 calculates the fee to be charged to the user when the image data included in the print job is printed based on the print setting values received in S502, using the fee table described above. The calculation result in S643' is displayed on the display device of the PC terminal 500 afterward, for example, on the print setting screen 980 shown in FIG. 22B (S609').

Figure 22B:
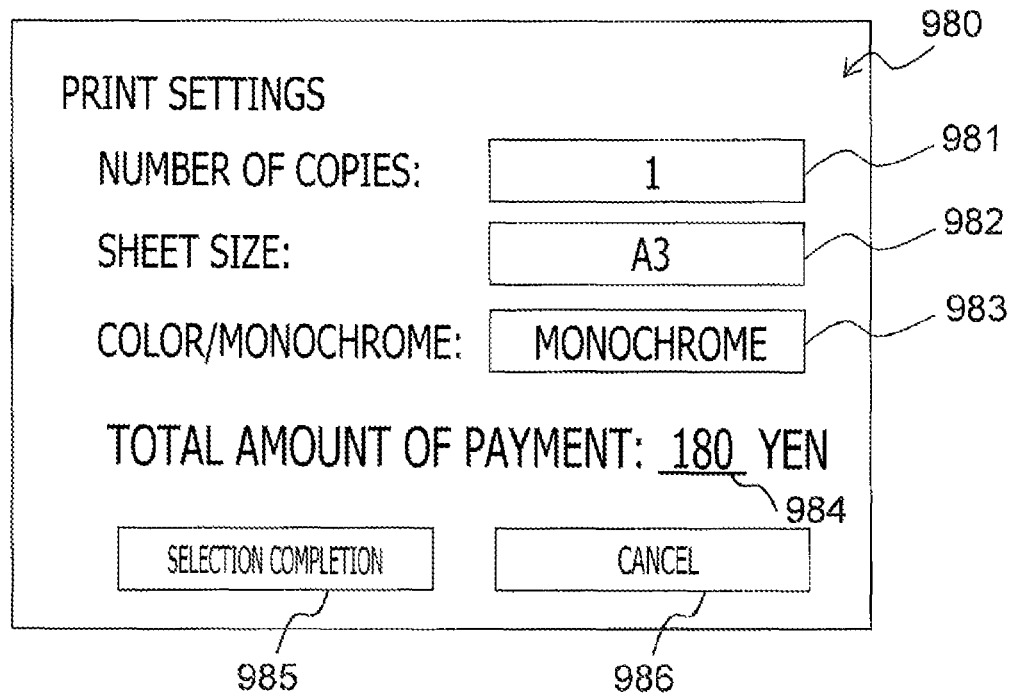

The print settings screen 980 shown in FIG. 22B shows the case where the contents of the print color setting field 983 have been changed on the print settings screen 980 of FIG. 22A, as described above. In the print color setting field 853, the setting of "color" in FIG. 22A has been changed to "monochrome" in FIG. 22B. In response to this change, the amount display field 984 shows "180 yen," which has been calculated in S643' in correspondence with the print setting values of "1 copy, A3 size, monochrome."

If the user who has viewed the print setting screen 980 in FIG. 22B checks the contents and decides that the process may proceed to printing as is, the user operates the "Setting Completion" button 985 on the print setting screen 980 by operating the operation panel of the PC terminal 500 as appropriate (S510: Yes), and the process proceeds to S521 onward in FIG. 14.

On the other hand, when the user operates the "Cancel" button 986 on the print setting screen 980 (S510: No), the process returns to S501. In this way, the print settings can be redone any number of times since S501-S609' until the user operates the "Setting Completion" button 985 on the print settings screen 980.

Figure 14:
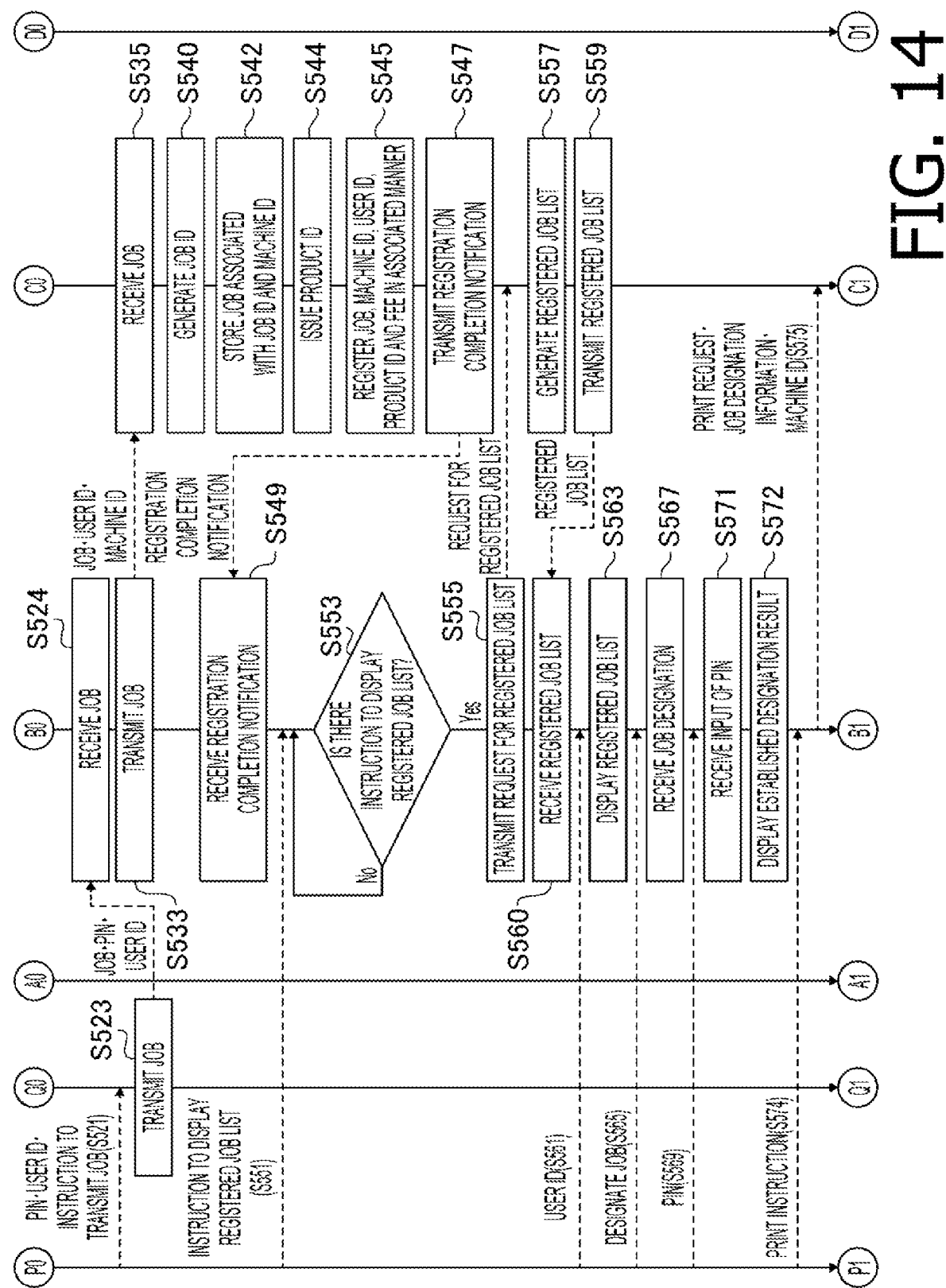
FIG. 14 is sequence flow illustrating processes performed by the PC terminal, the mobile terminal, the MFP, the data processing server and the transaction server.
Figure 17:
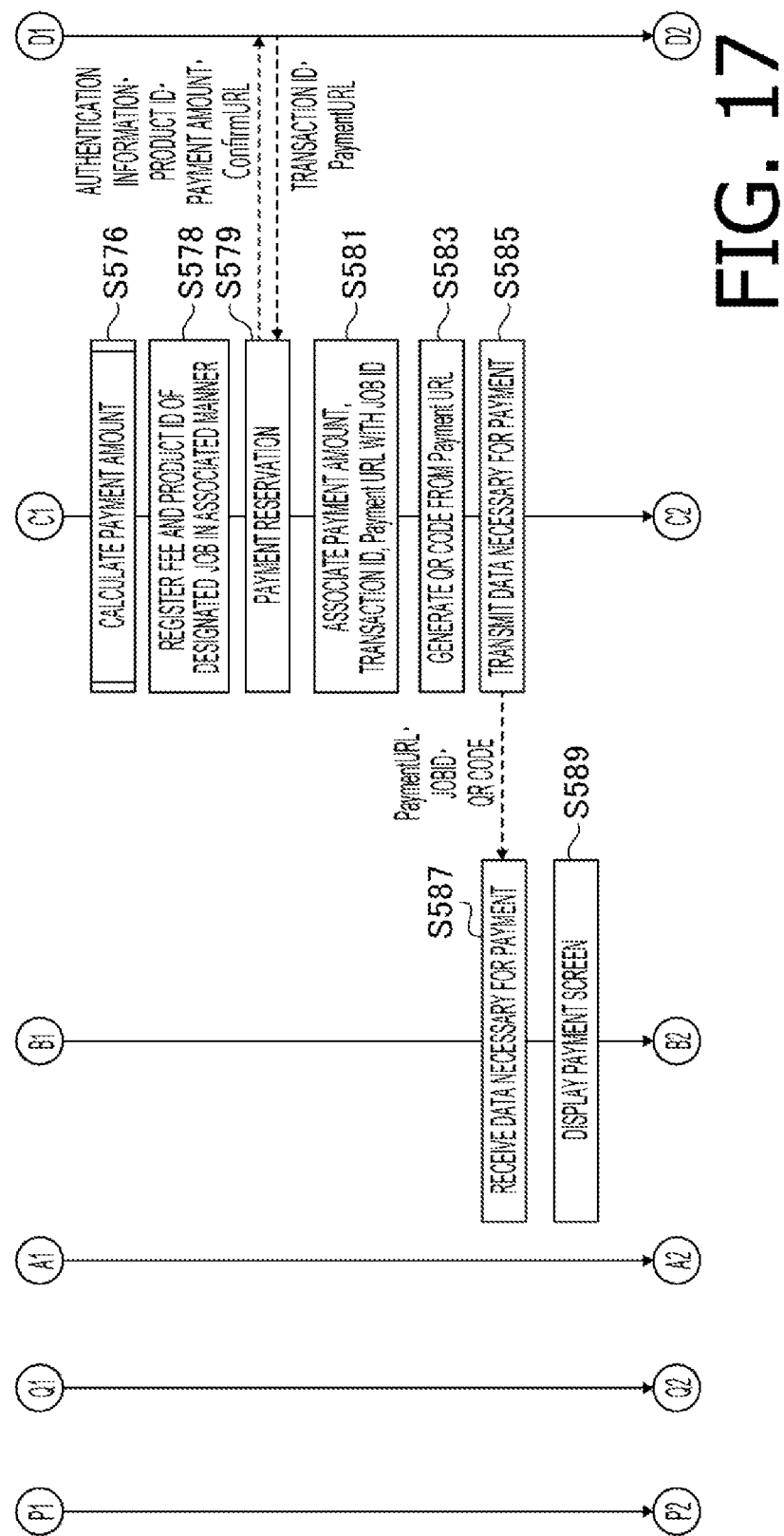
FIG. 17 is a sequence flow illustrating processes performed by the PC terminal, the mobile terminal, the MFP, the data processing server and the transaction server.

The subsequent processes are similar to those in FIG. 14, FIG. 17, and FIG. 19 in the second embodiment, so a detailed description will be omitted. The process performed in S533 in FIG. 14, FIG. 17, and FIG. 19 is an example of a third print job transmitting process. The process performed in S535 is an example of a third print job receiving process. The process performed in S625 is an example of a fourth print job transmitting process. The process performed in S626 is an example of a fourth print job receiving process. The process performed in S627 is an example of a third printing process. The process performed in S576 is also an example of the fourth fee determining process.

Effects of Modifications

In the modification configured as above, the effects same as those of the second embodiment are obtained. Further, the following effects are particularly obtained in this modification.

In the present modification, in particular, multiple sets of the reference print setting values including third and fourth print setting values that differ from each other are newly generated in S675 in response to a particular operation at the PC terminal 500. In S643, the third fee corresponding to the set of the reference print setting values including the third print setting values, and the fourth fee corresponding to the set of the reference print setting values including the fourth print setting values are determined. According to present modification, the third and fourth fees respectively corresponding to the newly generated third and fourth print setting values can be determined, so that multiple fees respectively corresponding to multiple sets of print setting values can be presented to the user (S609).

In the present modification, in particular, when the third and fourth print setting values are generated in S675, print setting values similar to the print setting values most recently used in the printing engine 290 are generated. The above-described content on the first print setting value display button 971 is an example of the same. In this way, the print setting values that have been applied immediately before in the print engine 290 can be presented to the user as prominent alternative candidates.

In this variation, in particular, when the third and fourth print setting values are generated in S675, the values similar to the most frequently used print setting values in the print engine 290 are generated. The indicated content of the third print setting value display button 973 described above is an example of such values. In this way, the most frequently used print setting values in the print engine 290 can be presented to the user as a versatile alternative candidate.

In the present modification, in particular, when the third and fourth print setting values are generated in S675, the print setting values that conform to the consumables information representing the status of the consumables already provided in the print engine 290 are generated. The indication on the second print setting value display button 972 is an example of such values. In this way, the print setting values that matches, for example, the type of paper, the amount of remaining ink, and the like installed in the print engine 290 at that time can be presented to the user as an alternative candidate. As will be described later, if the MFP 200 is configured to perform printing using the laser method, it is possible to present the user with print setting values that matches the amount of remaining toner.

In the present modification, in particular, prior to the transmission of the print job, in response to an appropriate operation of the operation panel of the PC terminal 500 in S600, the data processing server 100 generates new third and fourth print setting values that differ from each other and are applicable when the print engine 290 forms an image in S675. Thereafter, the fee table is transmitted by the data processing server 100 to the MFP 200 together with the third and fourth print setting values in S604, and through S605 and S606, transmitted to the PC terminal 500, and then obtained by the PC terminal 500 in S607. In the PC terminal 500, the third and fourth fees to be charged respectively corresponding to the third and fourth print setting values are determined in S643. Until the particular operation is performed, S675, S604, S605, S606, S607 and S643 are repeated in the PC terminal 500. In this way, until the user operates the "Fee OK" button 975, the generation of the third and fourth print setting values and the determination of the third and fourth fees respectively corresponding to those values are performed repeatedly. As a result, the PC terminal 500 can present the third and fourth fees together with the corresponding third and fourth print setting values to the user (S609).

Thereafter, when the "Fee OK" button 975 is operated on the PC terminal 500 and the print job is transmitted, the print job is obtained by the MFP 200 in S524 and then transmitted to the data processing server 100, and then received by the data processing server 100 in S535. The print job received by the data processing server is stored therein in S542.

Thereafter, when the user approves the third or fourth fee determined in S643 and the PC terminal 500 transmits the payment approval, the print job stored by the data processing server 100 is retrieved and transmitted to the MFP 200 in S625. After the transmitted print job is received by the MFP 200 in S626, an image formation by the print engine 290 is performed in S627.

As described above, according to the present modification, multiple fees respectively corresponding to multiple sets of print setting values can be presented to the user (S609), including the third and fourth amounts for image formation with use of the third and fourth print setting values newly generated by the data processing server 100. The user can execute so-called PC printing with use of the newly generated third or fourth print setting values.

In the above, determination of the fees related to printing by "calculation" using the fee table is described as an example, but the method to determine the fees is not necessarily limited to the above. That is, in a fee table separate from the aforementioned fee table, a fee may be associated with each of multiple categories of print setting values, such as the number of pages to be printed, and basic information such as the number of copies, the paper size, the print color setting, and the paper type, as well as extended information including the duty ratio of image data, the print coverage, and the like as described above. Then, the fee may be determined by referring to the table, without any particular calculation. For example, in the above example of the number of pages, in one table, for example, it is recorded such that the fee is xx yen if the number of printed pages is from MM to NN pages, and the fee is zz yen if the number of printed pages is from NN to KK pages. When the number of pages in the print data of the print file is obtained, the fee can be determined by referring to the table directly, without the need to calculate the fee as described above.

The above description is based on an example of the MFP 200 that performs printing in accordance with the inkjet method, but the printing method is not limited to the above. That is, the MFP 200 according to aspects of the present disclosures may perform printing in accordance with the laser method. In that case, the same effects as described above may be obtained. Further, the printing method is not necessarily limited to the inkjet or laser method, but can also be applied to the MFP 200 that performs printing in accordance with other known methods such as thermal transfer method.

The sequence flows are not limited to flows shown in FIG. 2, FIG. 5, FIG. 8, FIG. 12, FIG. 14, FIG. 17, FIG. 19, FIG. 20, but procedures may be added, deleted, or the order of procedures may be changed to the extent not to depart from the gist and technical concept of the embodiments.

In addition to the above already described, the methods according to the first embodiment, second embodiment, and each modification may be used in combination as appropriate.

Although no other examples are given, the present disclosures may be implemented with various modifications within the scope of not departing from the intent of the embodiments.

What is claimed is:

1. A printing system comprising:
a print engine; and
one or more controllers configured to perform:
obtaining print data;
controlling the print engine to print an image corresponding to the print data on a printing medium based on a print setting value;
generating a particular print setting value and another print setting value which applicable when the print engine prints the image in response to a particular operation is made on an external device, the particular print setting value and the another printing setting value being a print setting value which is the same as the print setting value most recently applied in time in the print engine, a print setting value which is the same as the print setting value most frequently applied in the print engine, or a print setting value which is the same as the print setting value that conforms to consumables information representing a status of consumables provided in the print engine, and the particular print setting value and the another print setting value being different from each other; and
determining multiple fees corresponding to a plurality of the print setting values, respectively, to be applied when the print engine prints the image on the printing medium, the plurality of print setting values include the particular print setting value and the another print setting value and the multiple fees include a fee corresponding to applying the particular print setting value and a fee corresponding to applying the another print setting value.

2. The printing system according to claim 1, wherein the one or more controllers are further configured to perform:
generate a second another print setting value being a print setting value which is the same as the print setting value most recently applied in time in the print engine, a print setting value which is the same as the print setting value most frequently applied in the print engine, or a print setting value which is the same as the print setting value that conforms to consumables information representing a status of consumables provided in the print engine, and the second another print setting, the particular print setting value and the another print setting value being different from each other, wherein the plurality of the print setting values further includes the second another print setting value and the multiple fees includes a fee corresponding to applying the second another print setting value.

3. The printing system according to claim 2, wherein the one or more controllers are further configured to cause a screen to be displayed with the multiple fees and their associated print setting values.

4. The printing system according to claim 3, wherein the screen is configured to receive a selection of the particular print setting value, the another print setting value or the second another print setting value or a change a setting print setting value.

5. The printing system according to claim 4,
wherein, in response to a selection to change the print setting value, the one or more controllers are configured to cause another screen to be display to receive a change in the print setting value, and wherein the one or more controllers are configured to determine a fee corresponding to the print setting value as changed.

6. The printing system according to claim 2,
wherein, the particular print setting value is a print setting value which is the same as the print setting value most recently applied in time in the print engine, the another print setting value is a print setting value which is the same as the print setting value most frequently applied in the print engine, and the second another print setting value is a print setting value which is the same as the print setting value that conforms to consumables information representing a status of consumables provided in the print engine.

7. A printing system comprising:
a printing device including:
a print engine configured to print an image on a printing medium; and
a first controller; and
a data processing server including:

a communication interface configured to communicate with the printing device; and
a second controller,
wherein the second controller is configured to perform:
receiving, from an external device, a first email to which a print file is attached and which is addressed to a printing device e-mail address assigned to the printing device, the first email including a print setting value of a print setting of the print file set by a user accessing a first URL of a print setting page;
determining a fee charged when an image is printed on the printing medium based on the print file attached to the first email;
generating a second email reciting a first amount of the fee, a second URL of a payment page used to pay the first amount, at least one example of changes made to the print setting value of the print file at the printing device, a second amount charged when an image is printed on the printing medium based on the at least one example, and a third URL of a payment page to settle the second amount;
transmitting the second email to the external device as reply to the first email;
determining the second amount reflecting change of the print setting value corresponding to accessing the third URL; and
transmitting at least one of print data based on the print file or storage destination information of the print data to the printing device through the communication interface after payment of the second amount is carried out by the user accessing the third URL recited in the second email, and
wherein the first controller is configured to perform:
obtaining the print data transmitted or the print data from a storage destination accessible by using the storage destination information transmitted; and
printing the image corresponding to the print data obtained on the printing medium by using the print engine based on the print setting value corresponding to accessing the third URL.

8. A printing system comprising:
a printing device including:
a print engine configured to print an image on a printing medium;
an operation panel; and
a first controller; and
a data processing server including:
a server memory; and
a second controller,
wherein the first controller is configured to perform:
obtaining, from an external device, a first print setting value to which print setting of a print job transmitted from an external device is related; and
transmitting the first print setting value,
wherein the second controller is configured to perform:
receiving the first print setting value transmitted;
generating a second print setting value different from the first print setting value received;
determining a first fee charged for the first print setting value received and a second fee charged for the second print setting value; and
transmitting the first fee and the second fee,
wherein the first controller and the second controller are configured to repeatedly generate the second print setting value, determine the first fee and the second fee and transmit the first fee and the second fee, until a particular operation related to selecting one of the first fee and the second fee is performed in the external device,
wherein, when the particular operation is performed in the external device:
the first controller is configured to perform:
obtaining the print job transmitted from the external device; and
transmitting the print job obtained to the data processing server; and
the second controller is configured to perform:
receiving the print job transmitted;
storing the print job received in the server memory; and
transmitting the print job stored in the server memory in response to transmitting payment approval of one of the first fee and the second fee corresponding to the particular operation, and
wherein the first controller is further configured to perform:
receiving the print job transmitted; and
controlling the print engine to print an image, in accordance with one of the first print setting value and the second print setting value corresponding to the particular operation, based on the print job received.

9. A printing system comprising:
a printing device including:
a print engine configured to print an image on a printing medium;
an operation panel; and
a first controller;
a data processing server including:
a server memory; and
a second controller; and
an external device,
wherein the second controller is configured to perform:
generating a print setting value and another print setting value which are applicable when the print engine prints the image in response to a first particular operation is made on the external device, the print setting value and the another print setting value being different from each other;
transmitting fee determination information with the print setting value and the another print setting value,
wherein the first controller is configured to perform:
obtaining the fee determination information; and
transmitting the fee determination information to the external device,
wherein the external device is configured to perform:
receiving the fee determination information;
a determining a fee and another fee charged for the print setting value and the another print setting value, respectively, using the fee determination information,
wherein the external device is configured to repeatedly determine the fee and the another fee until a second particular operation is performed in the external device,
wherein, when the second particular operation is performed in the external device:
the first controller is configured to perform:
obtaining a print job transmitted from the external device; and
transmitting the print job obtained to the data processing server; and
the second controller is configured to perform:
receiving the print job transmitted;
storing the print job received in the server memory; and transmitting the print job stored in the server memory in response to transmitting payment approval of one of the fee and the another fee corresponding to the second particular operation, and wherein the first controller is further configured to perform:

receiving the print job transmitted; and controlling the print engine to print an image, in accordance with one of the print setting value and the another print setting value corresponding to the second particular operation, based on the print job received.

* * * * *